US008458099B2

(12) United States Patent
Shear et al.

(10) Patent No.: US 8,458,099 B2
(45) Date of Patent: Jun. 4, 2013

(54) SYSTEM AND METHOD FOR ONLINE CONTENT LICENSING AND DISTRIBUTION

(75) Inventors: Jeffrey A. Shear, Ardsley, NY (US); Dmitry Starosta, Brooklyn, NY (US); Iain Scholnick, Mill Valley, CA (US)

(73) Assignee: LicenseStream, Inc., New York, NY (US)

( * ) Notice: Subject to any disclaimer, the term of this patent is extended or adjusted under 35 U.S.C. 154(b) by 850 days.

(21) Appl. No.: 11/944,051

(22) Filed: Nov. 21, 2007

(65) Prior Publication Data
US 2009/0132310 A1    May 21, 2009

(51) Int. Cl.
*G06Q 20/00* (2012.01)
(52) U.S. Cl.
USPC ............... 705/79; 705/77; 705/64; 705/52; 705/53; 705/54; 705/39; 902/2; 713/153; 713/154
(58) Field of Classification Search
USPC .......................................................... 705/79
See application file for complete search history.

(56) References Cited

U.S. PATENT DOCUMENTS

| | | | |
|---|---|---|---|
| 6,321,231 B1 | 11/2001 | Jebens et al. |
| 6,332,146 B1 | 12/2001 | Jebens et al. |
| 6,370,198 B1 | 4/2002 | Washino |
| 6,389,538 B1 | 5/2002 | Gruse et al. |
| 6,407,680 B1 | 6/2002 | Lai et al. |
| 6,587,837 B1 | 7/2003 | Spagna et al. |
| 6,593,860 B2 | 7/2003 | Lai et al. |
| 6,658,568 B1 | 12/2003 | Ginter et al. |
| 6,697,821 B2 | 2/2004 | Ziff et al. |
| 6,732,162 B1 | 5/2004 | Wood et al. |
| 6,747,706 B1 | 6/2004 | Geddes et al. |
| 6,766,305 B1 | 7/2004 | Fucarile et al. |
| 6,888,477 B2 | 5/2005 | Lai et al. |
| 6,976,010 B2 | 12/2005 | Banerjee et al. |
| 6,976,028 B2 | 12/2005 | Fenton et al. |
| 6,996,720 B1 | 2/2006 | DeMello et al. |
| 7,024,677 B1 | 4/2006 | Snyder et al. |
| 7,065,787 B2 | 6/2006 | Ganesan et al. |

(Continued)

FOREIGN PATENT DOCUMENTS

JP        2009181553 A  *  8/2009

OTHER PUBLICATIONS

U.S. Appl. No. 12/032,143, Title: System and Method for Online Content Production, filed Feb. 15, 2008 (135 pages).

(Continued)

*Primary Examiner* — James A Reagan
(74) *Attorney, Agent, or Firm* — McCarter & English, LLP

(57) ABSTRACT

A system and method for online content licensing and distribution is provided. A central website is accessible by content providers and content licensees via the Internet, and allows content providers to upload content to the central website. Licenses can be associated with uploaded content, and one or more licensees for the content can be designated. Royalty distributions can be defined and distributed to one or more recipients, and can be expressed as percentages of collected royalties or dollar amounts. An e-mail is automatically transmitted to a designated licensee which allows the licensee to access the uploaded content, pay for the content, and download the content. Collected payments are automatically distributed to one or more recipients in accordance with the royalty distributions. Suggested license fees for uploaded content can be generated and provided to the content provider, and uploaded content can be published to a third-party publication website or service.

24 Claims, 84 Drawing Sheets

U.S. PATENT DOCUMENTS

| | | |
|---|---|---|
| 7,133,846 B1 | 11/2006 | Ginter et al. |
| 7,155,415 B2 | 12/2006 | Russell et al. |
| 7,165,174 B1 | 1/2007 | Ginter et al. |
| 7,210,165 B2 | 4/2007 | Speare et al. |
| 7,242,324 B2 | 7/2007 | Lai et al. |
| 7,277,870 B2 | 10/2007 | Mourad et al. |
| 7,313,604 B2 | 12/2007 | Wood et al. |
| 7,337,147 B2 | 2/2008 | Chen et al. |
| 7,340,765 B2 | 3/2008 | Feldmeier |
| 7,355,531 B2 | 4/2008 | Lai et al. |
| 2002/0128935 A1 | 9/2002 | White et al. |
| 2003/0217010 A1* | 11/2003 | Stefik et al. ............. 705/51 |
| 2004/0218904 A1 | 11/2004 | Yoon et al. |
| 2004/0261027 A1 | 12/2004 | Dillon et al. |
| 2006/0206493 A1 | 9/2006 | Lipscomb et al. |
| 2006/0224517 A1* | 10/2006 | Shimpi et al. ............. 705/51 |
| 2007/0136486 A1 | 6/2007 | Al Amri |
| 2007/0150358 A1 | 6/2007 | Allen et al. |
| 2008/0177617 A1 | 7/2008 | Gupta |
| 2008/0183844 A1 | 7/2008 | Gavin et al. |
| 2008/0212936 A1 | 9/2008 | Gavin et al. |
| 2010/0306247 A1 | 12/2010 | Sidman |
| 2011/0258066 A1 | 10/2011 | Takahashi |

OTHER PUBLICATIONS

Office Action dated May 9, 2011, from U.S. Appl. No. 12/032,143 (16 pages).

Office Action mailed Jan. 4, 2012 in connection with U.S. Appl. No. 12/032,143 (17 pages).

* cited by examiner

FIG. 4D

LicenseStream™

Log-In|Register|HELP

Please take a moment to review your information. Click on any field you would like to change. When finished, click Update.

| | |
|---|---|
| Username: | jeffs@imagespan.com |
| E-Mail Address: | jeffs@imagespan.com |
| Registration Type: | Provider |
| Salutation: | Mr. |
| First Name: | Jeffery |
| Middle Initial: | *Add Middle Initial* |
| Last Name: | Shear |
| Suffix: | *Add Suffix* |
| Account Password: | Change Password |

*Warning:* All information can be revised on this page. Do not click you browser's "Back" button, as it may disrupt your registration.

A primary phone number and physical address is required for provider accounts. When finished, and once you are satisfied with the information above, click *Complete*

Primary Phone Number: *Required*

| | |
|---|---|
| Number: | 9999999999 |
| Extension: | |
| Phone Type: | Work Phone |

Primary Address: *Required*

| | |
|---|---|
| Address Line 1: | 180 Varick Street |
| Address Line 2: | |
| City: | New York |
| State/Region: | New York |
| Zipcode: | 10014 |
| Address Type: | Main Address |

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

LicenseStream™　　　　　　　　　　　　　　　Good Afternoon, Maxim Panchenko
　　　　　　　　　　　　　　　　　　　　　　　　　Log-Out|Edit Portfolio|HELP

| Register My Content | License My Content | Publish My Content | My Content Folder | My Transactions |

Manage My Content >　　　Manage Royalties　　　Group My Content　　　My Licensed Content

UPLOAD CONTENT

Royalty Group: [Default Royalty Group ▽]  [Add New]
　　　　　Image Format: [Unknown ▽]
[image]　　Content ID: [00660_splash_3]
　　　　　Description: [No Description]

Characters remaining: 4000
　　　　　Thumbnail: [　　　　　　　　　　　] [Browse]
　　　　　High Res URL: [http://staging.ttdevsolutions.com/LicenseStream/LicenseStreamContent/131/Di]
　　　　　Model Release: [None]
　　　　　Property Release: [None]
　　　　　Price: [500.0000]

[Upload]  [Clear]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

---

[Active Content]  Disable Content

UPLOADED CONTENT

Filter Content

Content Id: [　　　　　　　　　　　　　]
Description: [　　　　　　　　　　　　　]
Contract Item: [　　　　　　　　　　　　▽]

LicenseStream™

Good Afternoon, Maxim Panchenko
Log-Out | Edit Portfolio | HELP

| Register My Content | License My Content | Publish My Content | My Content Folder | My Transactions |

Manage My Content     Manage Royalties     Group My Content     My Licensed Content >

CONTENT SELECTION CRITERIA

Recent Top: [ ]    Date Range: From [ 8/30/2007 ] To [ 10/30/2007 ]   Content Id: [ ]

Buyer First Name: [ ]    Buyer Last Name: [ ]    [Filter]

LICENSED CONTENT

BMWSUPER

Order # 465
Order Time: 10/30/2007 12:53:18 PM

Content ID: BMWSUPER
Description: BMW 850 csi
Licensing Fee: $500.00

Click on the thumbnail for more information

Bentley

Order # 464
Order Time: 10/29/2007 6:40:58 PM

Content ID: Bentley
Description: Bentley Continental
Licensing Fee: $500.00

Click on the thumbnail for more information

Porche2

Order # 463
Order Time: 10/29/2007 5:48:53 PM

Content ID: Porche2
Description: Carrera
Licensing Fee: $500.00

Click on the thumbnail for more information

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

FIG. 6I

| Term | Value |
|---|---|
| # of Media Usages | 1 |
| Usage 1 | A |
| Media Matrix | Advertising I Periodicals I Newsletter (All Newsletter Types) I Printed |
| Placement | Any Placements on All Pages |
| Size | Up To 1/4 Page Image I Any Size Page |
| Version | All Versions |
| Quantity | Any Quantity |
| Duration | Up To 1 Year |
| Region(s) | North America I USA |
| Industry(ies) | Ecology, Environmental and Conservation |
| Language(s) | All Languages |
| Exclusivity | Non-Exclusive |

ADDTITIONAL LICENSE RESTRICTIONS
None

MEDIA SUMMARY CODE

IPLUSIV0100IU001I 1IAK1UNA2JAY3PAA4SAK5VAA6OAA7DZA8RH08IEC8LM19ENEI

CONTENT USAGE LICENSE

The Non-Exclusive license will start on 10/30/2007 and run for Up To 1 Year in the Ecology, Environmental and Conservation industry in the North America I USA region(s).

Back to List

©2007 ImageSpan All rights reserved. |Terms and Conditions|Privacy Policy

POWERED BY
ImageSpan

FIG. 8A

LicenseStream™  Good Afternoon, Maxim Panchenko
Log-Out|Edit Portfolio|HELP

| Register My Content | License My Content | Publish My Content | My Content Folder | My Transactions |

Generate License >     Review License     Assign Royalty Payments     Invoice Customer

DEFINE CONTENT

Provider: [131 - Mr. Maxim Panchenko ▽]
Content: [ ▽]
File Name: [ ]
Image Format: [Unknown ▽]
Caption: [ ]
Copyright: [ ]

○ Browse My LicenseStream Collection
○ Browse My Local Computer

[Browse My Content]

*Select Content to License or Upload New Content to Start Licensing*

Begin by Selecting or Adding New Content

We make it easy for you to select, upload and describe your content for easy identification and retrieval.

Our system also gives you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |

Popular Licenses:
● Advertising
○ Editorial
○ Internet

```
Brochure - 1/4 Page - 100,000 Print Run - 1 Year
Brochure - 1/2 Page - 50,000 Print Run - 1 Year
Newsletter - 1/4 Page - 10,000 Print Run - 1 Year
Pamphlets - 1/4 Page - 50,000 Print Run - 1 Year
Direct Mail - 1/4 Page - 100,000 Print Run - 1 Year
Direct Mail - 1/2 Page - 50,000 Print Run - 1 Year
FSI - 1/4 Page - 1 Million Print Run - 1 Year
FSI - 1/4 Page - 10 Million Print Run - 1 Year
Display - Billboard - Up to 10 Print Run - 1/4 Page - 6 Months
Display - Billboard - Up to 10 Print Run - 1/4 Page - 1 Year
```

Industry: [--SELECT AN INDUSTRY-- ▽]

DEFINE CUSTOMER

Search for Previous Customer:

First Name: [ ]

| Generate License > | Review License | Assign Royalty Payments | Invoice Customer |

DEFINE CONTENT

Provider: 131 - Mr. Maxim Panchenko
Content: BMWSUPER - BMW 850 csi
File Name: bmw-650-supercar.jpg
Image Format: Unknown
Caption: BMW 850 csi
Copyright: ImageSpan 2007

○ Browse My LicenseStream Collection
○ Browse My Local Computer

[Browse My Content] [Edit Content]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |

Popular Licenses:
● Advertising
○ Editorial
○ Internet

```
Direct Mail - 1/4 Page - 100,000 Print Run - 1 Year
Direct Mail - 1/2 Page - 50,000 Print Run - 1 Year
FSI - 1/4 Page - 1 Million Print Run - 1 Year
FSI - 1/4 Page - 10 Million Print Run - 1 Year
Display - Billboard - Up to 10 Print Run - 1/4 Page - 6 Months
Display - Billboard - Up to 10 Print Run - 1/4 Page - 1 Year
Display - Transmit Ad - Up to 10 Print Run - 1/2 Page - 6 Months
Display - Transmit Ad - Up to 10 Print Run - 1/2 Page - 1 Year
Display - In Store - Up to 5 Print Run - 1/4 Page - 6 Months
Display - In Store - Up to 5 Print Run - 1/4 Page - 1 Year
```

Industry: Construction and Contracting

DEFINE CUSTOMER

Search for Previous Customer:

First Name: Jeffrey
Last Name: Shear
Email: jshear@imagespan.com
Postal Code: 10014

[Search Previous Customer]

FIG. 8D

○ Internet    Direct Mail - 1/2 Page - 50,000 Print Run - 1 Year
FSI - 1/4 Page - 1 Million Print Run - 1 Year
FSI - 1/4 Page - 10 Million Print Run - 1 Year
Display - Billboard - Up to 10 Print Run - 1/4 Page - 6 Months
Display - Billboard - Up to 10 Print Run - 1/4 Page - 1 Year Industry:    --SELECT AN INDUSTRY-- ⌄

DEFINE CUSTOMER

Search for Previous Customer:

| Field | Value |
|---|---|
| First Name: | Jeffrey |
| Last Name: | Shear |
| Email: | jshear@imagespan.com |
| Postal Code: | 10014 |

[Search Previous Customer]

Licensee Information:

| Field | Value |
|---|---|
| Company: | Imagespan |
| First Name: | Jeffrey |
| Last Name: | Shear |
| Address Line 1: | 180 Varick Street |
| Address Line 2: | |
| City: | New York |
| State: | New York |
| Postal Code: | 10014 |
| Phone: | 212-222-2222 |
| Email: | jshear@imagespan.com |
| Buy on Account: | ☑ |

[Edit Customer Information]

FIG. 8F

| LicenseStream™ | | | | | Good Afternoon, Maxim Panchenko |
| --- | --- | --- | --- | --- | --- |
| | | | | | Log-Out\|Edit Portfolio\|HELP |
| Register My Content | License My Content | Publish My Content | My Content Folder | My Transactions | |

Generate License >    Review License    Assign Royalty Payments    Invoice Customer

DEFINE CONTENT

Provider: [131 - Mr. Maxim Panchenko ▾]
Content: [BMWSUPER - BMW 850 csi ▾]
File Name: [bmw-650-supercar.jpg]
Image Format: [Unknown ▾]
Caption: [BMW 850 csi]
Copyright: [ImageSpan 2007]

○ Browse My LicenseStream Collection
○ Browse My Local Computer

[Browse My Content]  [Edit Content]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |
| --- | --- | --- | --- |

Category: [--SELECT A CATEGORY-- ▾]
Type:     [--SELECT A TYPE-- ▾]
Detail:   [--SELECT A DETAIL-- ▾]

FIG. 8G

| LicenseStream™ | Good Afternoon, Maxim Panchenko |
| | Log-Out\|Edit Portfolio\|HELP |

| Register My Content | License My Content | Publish My Content | My Content Folder | My Transactions | |

Generate License >   Review License   Assign Royalty Payments   Invoice Customer

DEFINE CONTENT

Provider: 131 - Mr. Maxim Panchenko
Content: BMWSUPER - BMW 850 csi
File Name: bmw-650-supercar.jpg
Image Format: Unknown
Caption: BMW 850 csi
Copyright: ImageSpan 2007

○ Browse My LicenseStream Collection
○ Browse My Local Computer

[Browse My Content]  [Edit Content]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |

Category: Advertising
Type: Marketing Materials
Detail: No Details

Use in any marketing materials distributed to a targeted audience. Includes use in printed brochure, catalog, annual report, public relations and sales material. Also includes electronic (PDF) versions of the original printed uses. Applies to a specified end user products or service.

Duration: --SELECT A DURATION--
Industry: --SELECT AN INDUSTRY--
Region: --SELECT A REGION--
Region Detail: --SELECT A REGION--

FIG. 8H

```
LicenseStream™                                    Good Afternoon, Maxim Panchenko
                                                  Log-Out|Edit Portfolio|HELP

[Register My Content] [License My Content] [Publish My Content] [My Content Folder] [My Transactions]

Generate License >     Review License     Assign Royalty Payments    Invoice Customer
```

| DEFINE CONTENT | | Begin by Selecting or Adding New Content |
|---|---|---|
| Provider: | 131 - Mr. Maxim Panchenko ▼ | We make it easy for you to select, upload and describe your content for easy identification and retrieval. |
| Content: | BMWSUPER - BMW 850 csi ▼ | |
| File Name: | bmw-650-supercar.jpg | Our system also give you complete control over your content descriptions, allowing you to view, access and change them as needed. |
| Image Format: | Unknown ▼ | |
| Caption: | BMW 850 csi | |
| Copyright: | ImageSpan 2007 | The waiting is over. Gain the control you need to better manage your content. |
| ○ Browse My LicenseStream Collection | | |
| ○ Browse My Local Computer | | |
| [Browse My Content] [Edit Content] | | |

DEFINE LICENSE PARAMETERS

| Popular Licenses | Category License | Build My License | My Licenses |
|---|---|---|---|

| Usage A: | [Add Another Usage] |
|---|---|
| Category: | All Categories ▼ |
| Media Type: | Book ▼ |
| Media Detail: | All Book Types ▼ |
| Distribution: | All Distribution Formats ▼ |
| Duration: | Life Of Item ▼ |
| Print Run: | Any Quantity ▼ |
| Industry: | Fashion ▼ |
| Region: | Asia ▼ |
| Region Detail: | Mongolia ▼ |

FIG. 8K

LicenseStream™  Good Afternoon, Maxim Panchenko
Log-Out|Edit Portfolio|HELP

| Register My Content | License My Content | Publish My Content | My Content Folder | My Transactions |

Generate License >    Review License    Assign Royalty Payments    Invoice Customer

DEFINE CONTENT

Provider: [131 - Mr. Maxim Panchenko ▼]
Content: [BMWSUPER - BMW 850 csi ▼]
File Name: [bmw-650-supercar.jpg]
Image Format: [Unknown ▼]
Caption: [BMW 850 csi]
Copyright: [ImageSpan 2007]

○ Browse My LicenseStream Collection
○ Browse My Local Computer

[Browse My Content]  [Edit Content]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |

Reuse Previously Saved License: [--SELECT A SAVED LICENSE-- ▼]  [Refresh]  [Delete License]
Reuse Existing License: [         ]  [Browse]

FIG. 8M

LicenseStream™     Good Afternoon, Maxim Panchenko
Log-Out|Edit Portfolio|HELP

| Register My Content | License My Content | Publish My Content | My Content Folder | My Transactions |

Generate License >     Review License    Assign Royalty Payments    Invoice Customer

DEFINE CONTENT

Provider: 131 - Mr. Maxim Panchenko
Content: BMWSUPER - BMW B50 csi
File Name: bmw-650-supercar.jpg
Image Format: Unknown
Caption: BMW B50 csi
Copyright: ImageSpan 2007

○ Browse My LicenseStream Collection
○ Browse My Local Computer

[Browse My Content] [Edit Content]

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

DEFINE LICENSE PARAMETERS

| Popular Licenses | Category License | Build My License | My Licenses |

Reuse Previously Saved Licenses: ADVMarkPackUSA1Yr [Refresh] [Delete License]
Reuse Existing License: [Browse]

DEFINE CUSTOMER

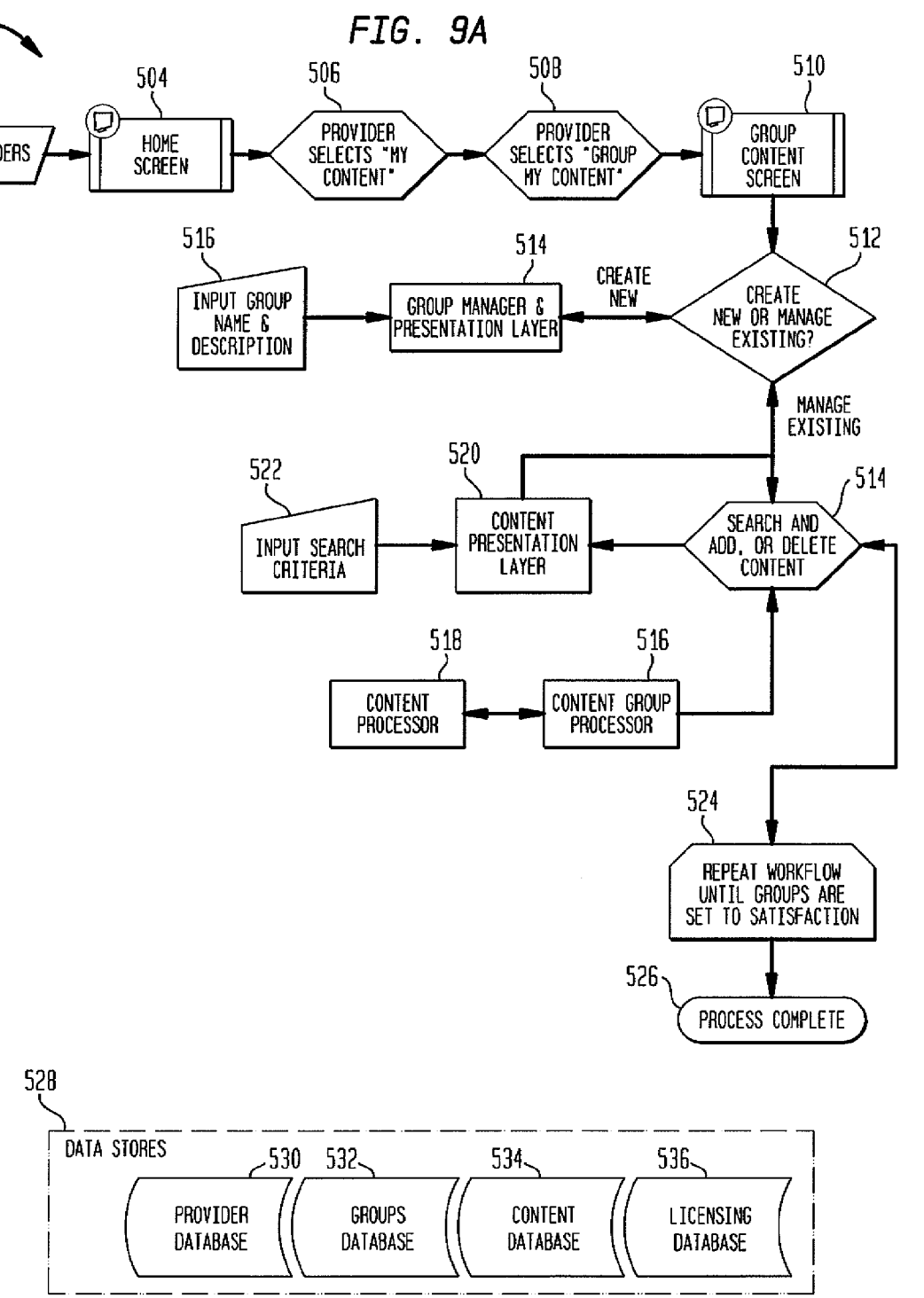

| DEFINE ROYALTIES | | | |
|---|---|---|---|
| Royalty Party: | [ ▼ ] [New Party] | | |
| First Name: | New | Last Name: | RoyaltyParty |
| Address: | address | Address 2: | address 2 |
| City: | city | State: | South Carolina ▼ |
| Zip Code: | 10010 | | |

[Save] [Cancel]

ROYALTY CALCULATOR

| Licensing Fee | $ 500.00 | % 100 | |
| ImageSpan | $ 10.00 | % 2.00 | |
| Maxim Panchenko | $ 430.00 | % 86.00 | (content provider) |
| Jenn Gallon | $ 10.00 | % 2 | [Remove] |
| Dmitry Starosta | $ 25.00 | % 5 | [Remove] |
| Michael Gorman | $ 25.00 | % 5 | [Remove] |

[Recalculate]

Need help calculating royalties? [Open Calculator]

SAVE ROYALTIES

[Save & Proceed]  [Start Over]

FIG. 10H

LicenseStream™

Good Afternoon, Maxim Panchenko
Log-Out|Edit Portfolio|HELP

| Register My Content | License My Content | Publish My Content | My Content Folder | My Transactions |

Generate License    Review License    Assign Royalty Payments    Invoice Customer >

ORDER INFORMATION

ImageSpan
180 Varick Street Suite 408
New York, NY 10014-5464

| Date | Order # |
|---|---|
| 10/30/2007 | 465 |

Bill To
Jeffrey Shear
180 Varick Street
New York, NY 10014-5464

| Quantity | Description | Amount |
|---|---|---|
| 1 | Content ID:BMWSUPER<br>Provider: Mr. Maxim Panchenko<br>Caption: BMW 850 csi<br>The Non-Exclusive license will start on 10/30/2007 and run for Up To 1 Year in the Ecology Environmental and Conservation industry in the North America ] USA region(s) | $500.00 |
| | Total: | $500.00 |

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

PAYMENT TYPES ACCEPTED

The checked payment types below will be available to the buyer. Please note that the credit card payment is always accepted. "Buy On Account" option gives the buyer 30 days to pay.

[✓] Buy on Account

PROCESS ORDER

[Create Invoice]                                    [Cancel Order]

FIG. 12A

From: LicenseStream[do-not-reply@imagespan.com]  Sent: Tue 10/30/2007 12:00 AM
To: Jeffrey A. Shear
Cc:
Subject: LicenseStream Pending Invoice-Alert Dear Jeffrey Shear, This automated e-mail has been sent to notify you about a pending LicenseStream invoice generated by Mr. Maxim Penchenko.

Here is the invoice summary:

Content Id: BMWSUPER
Content File: bmw-650i-supercar.jpg
Content Format: Unknown
Invoice Date: Tuesday, October 30, 2007
Invoice Status: Invoice Pending
Invoice Amount: $500.00

Please click on the link to preview and pay the invoice: Process Invoice

If your email provider does not allow active links please copy and paste the following URL into browser address field:

http://staging.imagespan.com/licensestream10/proxyLogin.aspx?wid=G3LIE%2Fv5yRLPT0oJWigx0%3d%3d&ReturnUrl=Orders%2fprocessInvoice.aspx%3finvoiceid%3d412

PLEASE NOTE: THIS MESSAGE IS AUTOMATICALLY GENERATED. DO NOT REPLY TO THIS MESSAGE. THANK YOU

The information in this e-mail and in any attachments is confidential, privileged and the property of ImageSpan, Inc. If you received this message in error, please destroy the message, delete any copies and attachments stored on your systems and notify the sender immediately. Any further distribution or copying of this message is strictly prohibited.

FIG. 12B

LicenseStream™

Good Afternoon, Jeffrey Shear
Log-Out|Edit Portfolio|HELP

My Transactions | Publish My Content

INVOICE INFORMATION

ImageSpan
180 Varick Street Suite 408
New York, NY 10014-5464

| Date | Invoice # | Invoice Status |
|------|-----------|----------------|
| 10/30/2007 | 412 | Unpaid |

Bill To
Mr. Jeffrey Shear
180 Varick Street
New York, NY 10014

| Quantity | Description | Amount |
|----------|-------------|--------|
| 1 | Content ID:BMWSUPER<br>Provider: Mr. Maxim Panchenko<br>Caption: BMW 850 csi<br>The Non-Exclusive license will start on 10/30/2007 and run for Up To 1 Year in the Ecology Environmental and Conservation industry in the North America ( USA region(s) | $500.00 |

Total: $500.00

INVOICE PAYMENT

Please read the information below before proceeding:

1. Credit or Debit Card option.

A buyer is redirected to PayPal website to make the payment. After a successful payment the buyer is returned to LicenseStream and is provided with the download information of the purchased content.

2. Buy On Account option.

A buyer will have 30 days to make a payment and is provided with the download information of the purchased content immediately.

◉ Credit or Debit Card    ○ Buy on Account

Begin by Selecting or Adding New Content

We make it easy for you to select, upload and describe your content for easy identification and retrieval.

Our system also gives you complete control over your content descriptions, allowing you to view, access and change them as needed.

The waiting is over. Gain the control you need to better manage your content.

You are now being redirected to PayPal website...

FIG. 12G

```
INVOICE NOTES

Add Invoice Note

Created By: Jeffrey Shear
Created At: 10/30/2007 1:12:00PM
Last Updated At: 10/30/2007 1:12:00PM Test note Edit   Delete
```

©2007 ImageSpan All rights reserved. |Terms and Conditions|Privacy Policy

POWERED BY ImageSpan

FIG. 12H

LicenseStream™

Good Afternoon, Jeffrey Shear
Log-Out|Edit Portfolio|HELP

My Transactions    Publish My Content

INVOICE SELECTION CRITERIA

Date Range: From 8/30/2007 To 10/30/2007  Provider: [   ]  Filter

| Pending Invoices | Invoices to Pay | Invoice History | | | |
|---|---|---|---|---|---|
| ID | Status | Amount | Date | Provider | |
| 411 | Invoice Pending | $500.00 | | Mr. Maxim Panchenko | View/Pay |
| 418 | Invoice Pending | $500.00 | | Mr. Maxim Panchenko | View/Pay |
| 402 | Invoice Pending | $500.00 | | Mr. Maxim Panchenko | View/Pay |
| 401 | Invoice Pending | $500.00 | | Mr. Maxim Panchenko | View/Pay |
| 344 | Invoice Pending | $550.00 | 10/19/2007 9:48:04 PM | Mr. Maxim Panchenko | View/Pay |
| 337 | Invoice Pending | $550.00 | 10/18/2007 2:52:57 PM | Mr. Maxim Panchenko | View/Pay |
| 294 | Invoice Pending | $550.00 | 10/1/2007 2:57:25 PM | Mr. Maxim Panchenko | View/Pay |

Begin by Selecting or Adding New Content

We make it easy for you to select, upload and describe your content for easy identification and retrieval Our system also give you complete control over your content descriptions, allowing you to view, access and change them as needed.

The waiting is over. Gain the control you need to better manage your content.

©2007 ImageSpan All rights reserved. |Terms and Conditions|Privacy Policy

POWERED BY ImageSpan

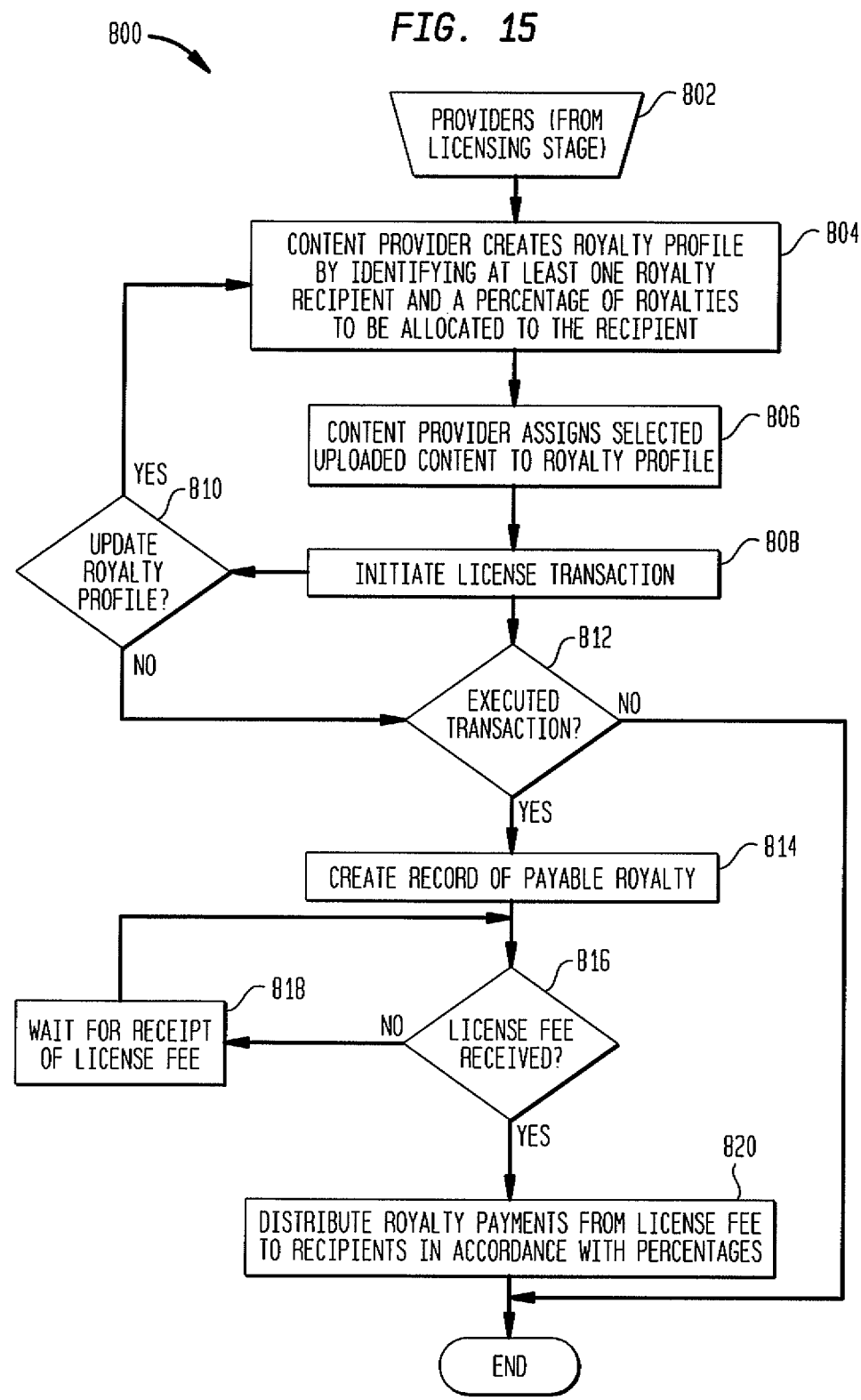

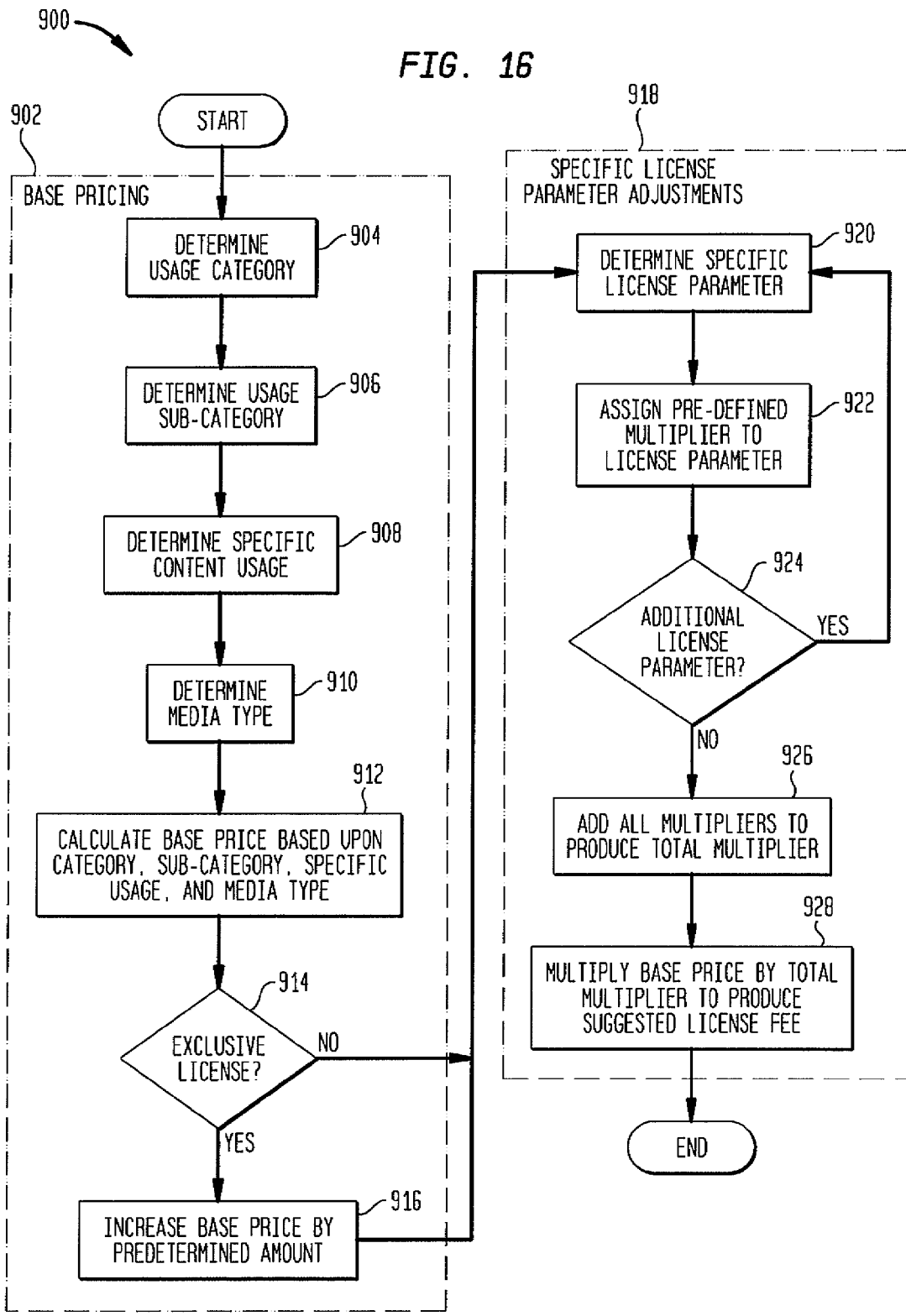

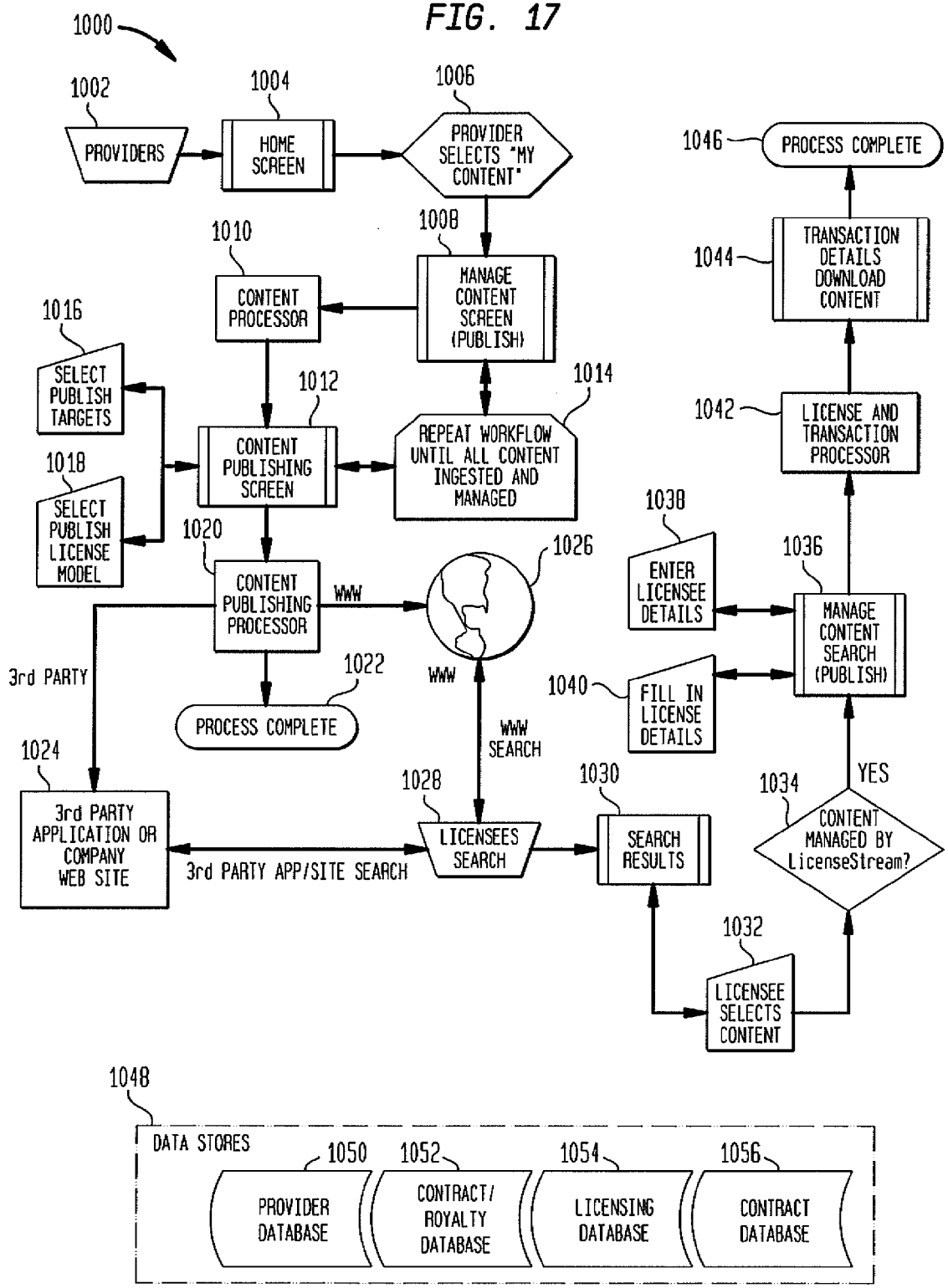

FIG. 18C

| | | | | |
|---|---|---|---|---|
| LicenseStream™ | | | | Good Afternoon, Maxim Panchenko |
| | | | | Log-Out\|Edit Portfolio\|HELP |
| My Content Folder | License My Content | Publish My Content | My Transactions | |

PUBLISH MY CONTENT

SELECT CONTENT TO PUBLISH

| Thumbnail | Content id | Description | Ingest Date | Royalty Group | Published? |
|---|---|---|---|---|---|
|  | ItsAHitx_thumb | Boy hitting a baseball | 11/20/2007 | Default Royalty Group | Published |

PUBLISH CONTENT TO GOOGLE BASE

Thank you for publishing your content to Google Base.

The listing will include the image thumbnails, caption, description, and any keywords you included. The caption will be used as the title for the item, and the description will appear as full text under caption. Keywords are marked as labels in Google Base and are searchable, but may not appear in the search results window. Lastly, a direct link is included to license the content from Imagespan, and your name and e-mail address are listed as the content's author under contact information.

Please note that it may take up to 24 hours for your content to appear in searches.

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

©2007 ImageSpan All rights reserved. |Terms and Conditions|Privacy Policy

POWERED BY
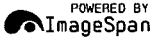ImageSpan

FIG. 18D

| LicenseStream™ | | | | Good Afternoon, Maxim Panchenko |
| --- | --- | --- | --- | --- |
| | | | | Log-Out\|Edit Portfolio\|HELP |
| My Content Folder | License My Content | Publish My Content | My Transactions | |

PUBLISH MY CONTENT

SELECT CONTENT TO PUBLISH

Content Id:
Description:
Royalty Group:
Date Range: From: To:

| Thumbnail | Content_id | Description | Ingest Date | Royalty Group | Published? | |
| --- | --- | --- | --- | --- | --- | --- |
| | ItsAHitx_thumb | Boy hitting a baseball | 11/20/2007 | Default Royalty Group | Published | Unpublish |
| | ImBored_thumb | Young girl with head in hands | 11/15/2007 | Default Royalty Group | Published | Unpublish |
| | STN | Stan | 11/15/2007 | bg | | Select |
| | HorsePortait_thumb | White horse portrait | 11/15/2007 | bg | | Select |
| | MRK1 | http://blog.raduceuca.com/wp-content/uploads/2006/10/ferrari2.jpg | 11/15/2007 | Custom 2 | | Select |
| | FER7 | http://blog.raduceuca.com/wp-content/uploads/2006/10/ferrari2.jpg | 11/15/2007 | Custom 2 | | Select |
| | Fer4 | http://blog.raduceuca.com/wp-content/uploads/2006/10/ferrari2.jpg | 11/15/2007 | Custom 2 | | Select |
| | Dune_thumb | No Description | 11/15/2007 | Default Royalty Group | | Select |

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

FIG. 18E

Google Base BETA

Keywords: imagespan    [Search Base] [Search the Web]

Home > "imagespan" > Items

Sort by: Relevance

Portrait of a Pug dog.
Application: imagespan-licensestream-1...   Label: imagespan.pug.dog,...   Megapixels: 900
Portrait of a Pug dog.
http://staging.imagespan.com - from Imagespan/LicenseStream on Nov 13 - Report item

Web Developer / Designer
Employer.imagespan  Job function: web developer/designer  Location info: west village
...building cross-browser applications We are a dynamic, fast-paced, high-growth internet company
(www.imagespan.com) that rewards meritorious performance. ...
http://ajobinmanhattan.jobthread.com - from JobThread on Nov 19 - Report item

ImageSpan and PLUS Coalition Streamline Image Licensing Process
Author: imagespan inc.  Publish date: dec 19, 2006  News source: prweb
... has selected ImageSpan Inc. as the exclusive technology provider for the PLUS ... New under development by
PLUS and ImageSpan, the PLUS License Registry...
http://prweb.com - from PRWeb on 12/20/06 - Report item

Aston Martin DB 9 Yellow
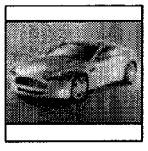
Application: Imagespan-licensestream-1...   Megapixels: 900   Subject: automobiles
Aston Martin DB 9 Yellow 3/4 right view.
http://staging.imagespan.com - from Imagespan/LicenseStream on Nov 13 - Report item

Coyonne444
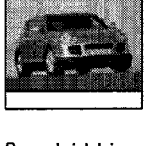
Application: imagespan-licensestream-1...   License type: popular usages
Coyonne444.
http://staging.imagespan.com - from Imagespan/Licensestream on Nov 7 - Report item

Boy hitting a baseball
Application: imagespan-licensestream-1...   Megapixels: 6,000  Subject: sports baseball youth
Boy hitting a baseball at a little league game in NY.
http://staging.imagespan.com - from Imagespan/LicenseStream on Nov 20 - Report item

FIG. 18I

| LICENSE INFORMATION |
|---|

The following information is required to purchase a license for this content. Note that by entering this information, you are creating an account with LicenseStream, a product of ImageSpan. Your account information will be stored on Imagespan servers in reference to this and any other content licenses purchased through LicenseStream. You may access your account at anytime to retrieve and/or edit your account data and to review past orders.

ImageSpan will not send you marketing materials, nor will they give or sell your information to a third party for marketing purposes. The information you provide is solely to be used in the manner described in the above paragraph and to communicate matters regarding your LicenseStream account and/or related orders, or in regards to official LicenseStream business. For more information, please review our Privacy Policy. If you have any questions, feel free to contact LicenseStream Support.

Contact Information

First Name: Maxim
Last Name: Panchenko
Username: maxim220
Password:
Confirm Password:
E-Mail: maxim220@maxim220.com Address Information Address Line 1: Address
Address Line 2: Address2
City: City
State: State
Zipcode: 10010

FIG. 18J

LicenseStream™

Good Afternoon, Maxim Panchenko
Log-Out|Edit Portfolio|HELP

ORDER INFORMATION

ImageSpan
190 Varick Street Suite 408
New York, NY 10014-5464

| Date | Order # |
|---|---|
| 11/20/2007 | 587 |

Bill To
Mr. Maxim Panchenko
Address
Address2
City, Alabama 10010

| Quantity | Description | Amount |
|---|---|---|
| 1 | Content ID: Aston Martin<br>Provider: Mr. Maxim Panchenko<br>End User:<br>Caption: great car for a common person<br><br>The Non-Exclusive license will start on 11/20/2007 and run for Up To 1 Year in the Business Consulting and Services industry in the North America | USA region(s).<br><br>Usage A<br><br>Parameter Value<br>Media Matrix Advertising | Display | All Display Types | Printed<br>Placement Any Placements on All Pages<br>Size Any Size Image | Any Size Media<br>Version All Versions<br>Quantity Any Quantity<br>Duration Up To 1 Year<br>Region(s) North America | USA<br>Industry(ies) Business Consulting and Services<br>Language(s) All Languages<br>Exlusivity Non-Exclusive<br><br>PLUS MEDIA/SUMMARY CODE:<br>1PLUS1V01001U0031I1AK1UNA2B1G3PAA4SAA5VAA6OAA7DUW8R<br>H08ICOBLAA9ENEI1AK1UN8280G3PAA4SAA5VAA6OAA7DUW8RH<br>08ICOBLAA9ENEI1AK1UNC2EAR3PAA4SAA5VAA6OAA7DUW8RH0<br>8ICOBLAA9ENEI | $10,884.00 |

Begin by Selecting or Adding New Content

We make it easy for you to select, upload and describe your content for easy identification and retrieval.

Our system also give you complete control over your content descriptions, allowing you to view, access and change them as needed.

The waiting is over. Gain the control you need to better manage your content.

SYSTEM AND METHOD FOR ONLINE CONTENT LICENSING AND DISTRIBUTION

BACKGROUND OF THE INVENTION

1. Field of the Invention

The present invention relates to web-based distribution of digital content. More specifically, the present invention relates to a system and method for online content licensing and distribution.

2. Related Art

In today's society, digital content (including pictures, videos, music, etc.) is created by individuals, corporations, and other entities at a considerable rate. With the prevalence of digital photography, videography, and music production, the distribution and licensing of digital content is of critical importance to many business entities.

Frequently, the Internet is utilized to transmit digital content from one entity to another. Content sharing websites exist, such as SnapFish and ShutterFly, which allow individuals to upload digital content (e.g., photos) to a central website, and to share the uploaded content with designated recipients, over the Internet. Unfortunately, such websites do not provide a robust way to license uploaded content to individuals, and to collect and automatically distribute royalties associated with content to one or more entities. Indeed, with many content sharing websites, the ability to define royalty distributions amongst multiple recipients, and to automatically distribute collected royalties to such recipients, is lacking. Still further, existing content sharing websites lack a robust mechanism for suggesting license fees for uploaded content to users, based upon information about content usage, media type, license exclusivity, and specific parameters associated with content licenses.

Accordingly, what would be desirable, but has not yet been provided, is a system and method for online content licensing and distribution, which allows content providers to upload content to a central website, define licenses and royalties associated with uploaded content, obtain a suggested license fee for the uploaded content, and to automatically collect and distribute royalties acquired by licensees of the uploaded content, with minimal intervention on the part of content providers.

SUMMARY OF THE INVENTION

The present invention relates to a system and method for online content licensing and distribution. The invention comprises a central website accessible by content providers and content licensees via the Internet. Content providers are provided with a plurality of user interface screens, accessible using conventional web browsers, which allow the content providers to upload content (including audio and video files, etc.) to the central website. The content providers can define licenses associated with uploaded content (by creating customized licenses or utilizing pre-defined licenses provided by the present invention), can designate one or more licensees for the content, and can define a royalty profile including royalty distributions associated with the uploaded content. The royalty distributions could be distributed to one or more recipients, and could be expressed as percentages of collected royalties or dollar amounts. The website allows content providers to easily defined new licenses, manage existing licenses, and monitor royalty payments. When the content has been uploaded and a license has been associated with the content by the content provider (initiating a license transaction), the present invention automatically transmits an e-mail to a designated licensee which allows the licensee to access the uploaded content. The licensee is provided with an invoice and is given the option to pay for the content electronically or through conventional means (e.g., by check). When payment is processed, the content is downloadable by the licensee to the licensee's local computer. Collected payments are automatically distributed by the present invention to one or more recipients in accordance with the royalty distribution defined by the content provider.

The present invention generates a unique content identifier associated with each uploaded item of content to facilitate tracking of content and detection of lost or unauthorized content. A third-party transactional enforcement system could be utilized with the present invention to ensure that uploaded content is only used in accordance the terms and conditions of the content license. A user can define specific rights and restrictions associated with uploaded content utilizing the present invention, and uploaded content can be published using one or more external (e.g., third-party) services, websites, etc. The uploaded can be published using an Internet-accessible content base and in accordance with a licensing method, and a potential licensee can search for the content using the content base.

The present invention includes the ability to generate a suggested license fee for uploaded content. Suggested license fees are generated by calculating a base price for uploaded content, and then adjusting the base price based upon specific parameters associated with a content license. The base price is calculated based upon usage categories, usage sub-categories, specific content usages, and media types associated with uploaded content, and can be adjusted if the license is an exclusive license. Specific license parameters are determined, and a pre-defined multiplier is assigned to each license parameter. After all parameters have been determined and multipliers assigned, a total multiplier is calculated by adding the multipliers. The base price is multiplied by the total multiplier to produce a suggested license fee for the content provider.

BRIEF DESCRIPTION OF THE DRAWINGS

The foregoing features of the invention will be apparent from the following Detailed Description of the Invention, taken in connection with the accompanying drawings, in which:

FIGS. 4A-4M are screenshots of user interface screens generated by the present invention for registering users and managing user accounts;

FIGS. 6A-6I are screenshots of user interface screens generated by the present invention for uploading and managing content, and for defining royalty terms associated with uploaded content;

FIGS. 9A-9B are flowcharts showing processing steps according to the present invention for allowing content providers to group content and to review licenses associated with uploaded content;

FIGS. 10A-I are screenshots of user interface screens generated by the present invention for grouping content and reviewing licenses associated with uploaded content;

FIGS. 12A-12I are screenshots of user interface screens generated by the present invention for allowing licensees to pay for and download desired content;

Figure 14A:
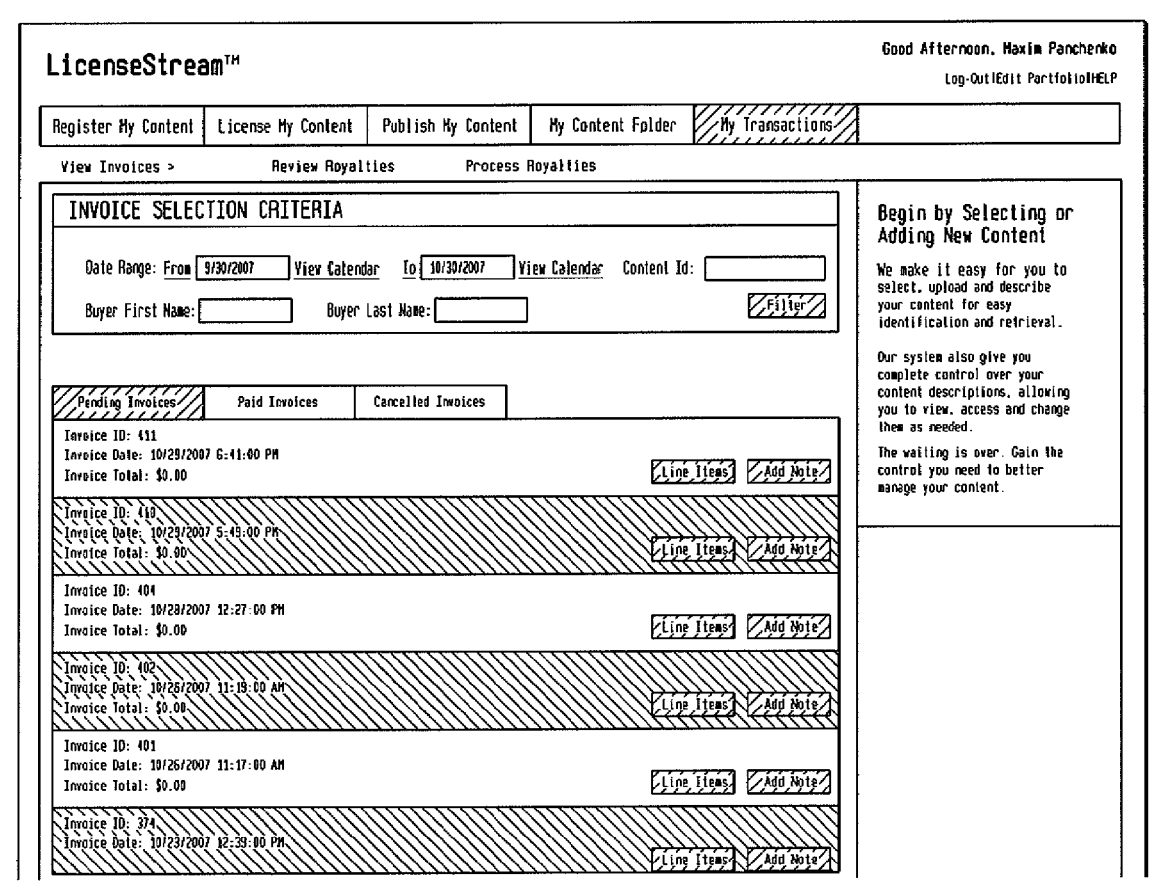
Figure 14D:
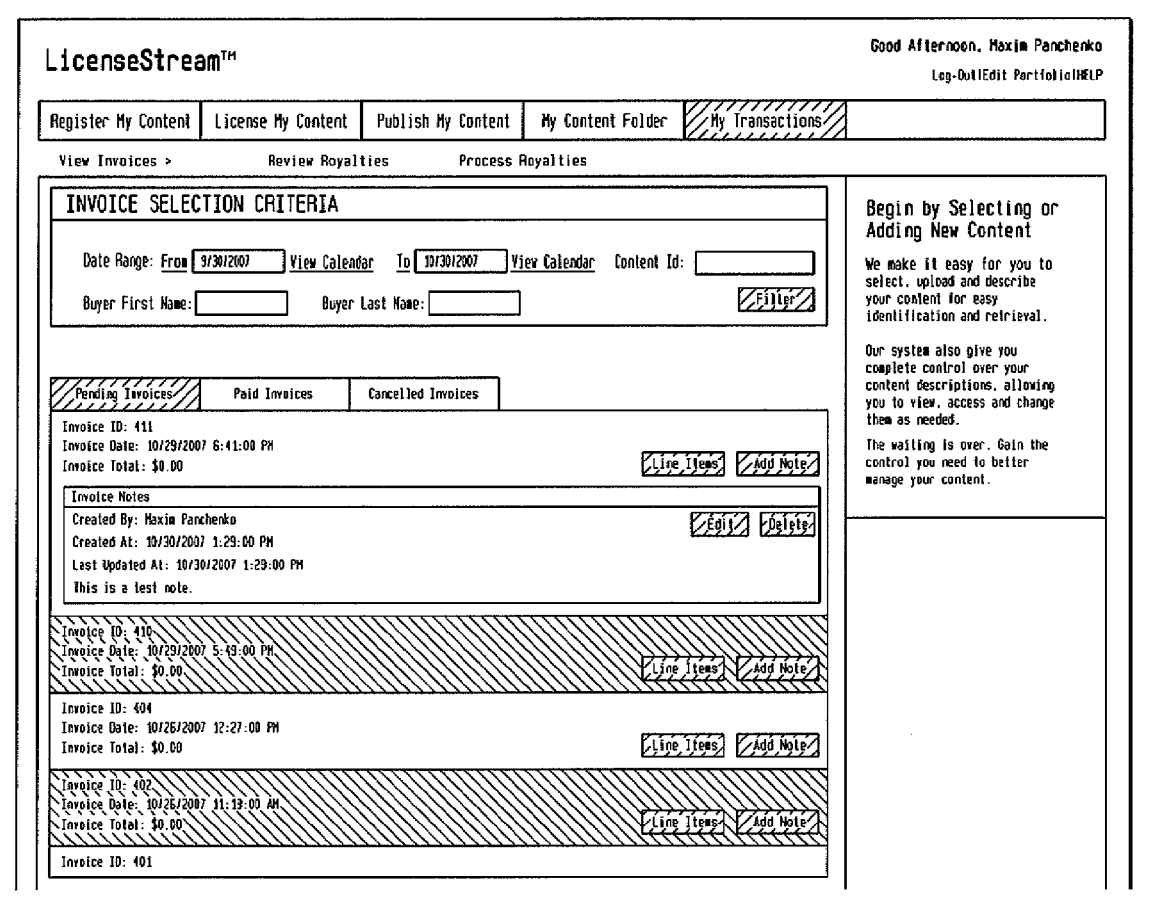
Figure 14E:
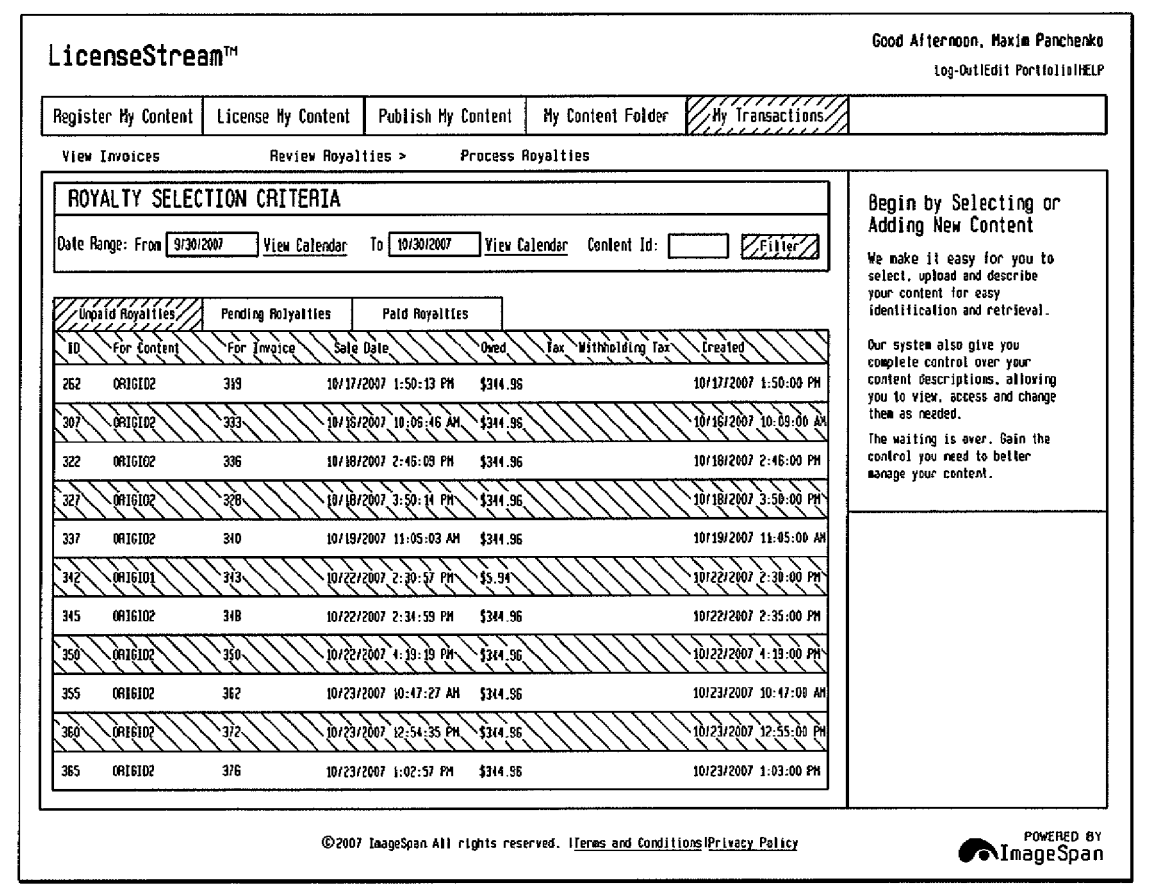
Figure 14I:
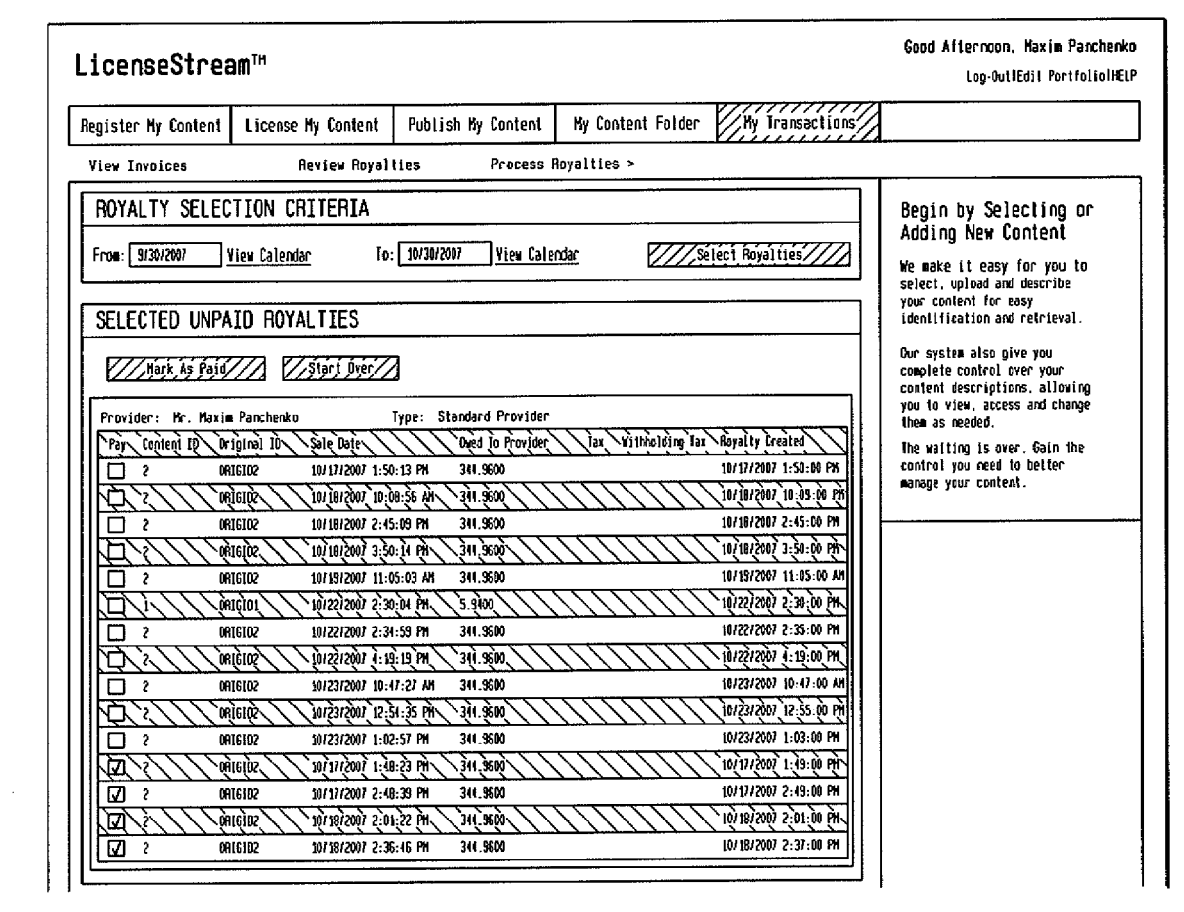
Figure 14J:
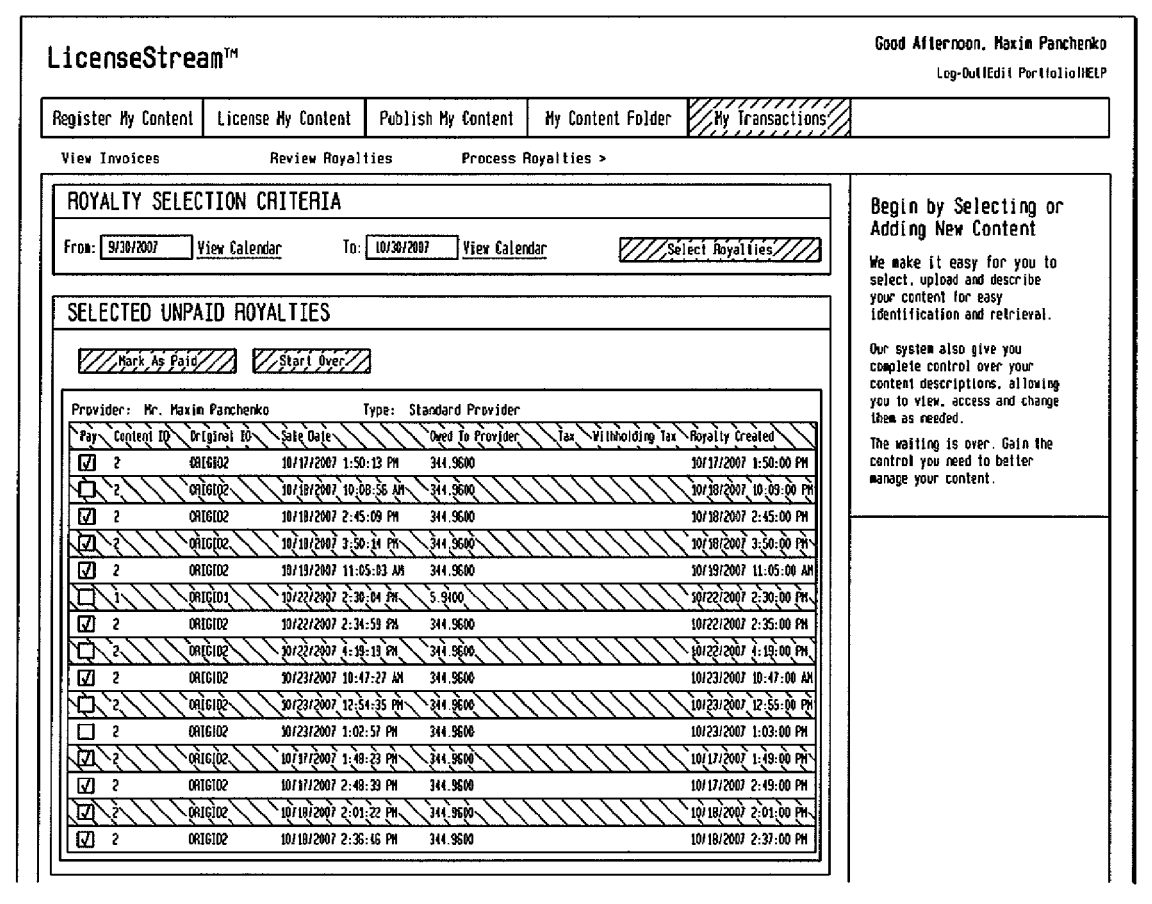

FIGS. 14A-14K are screenshots of user interface screens generated by the present invention for managing invoices and royalties;

FIG. 15 is a flowchart showing, in greater detail, processing steps according to the present invention for allowing content providers to define and collect royalties for uploaded content;

FIG. 16 is a flowchart showing processing steps according to the present invention for producing a suggested license fee for uploaded content;

FIG. 17 is a flowchart showing processing steps according to the present invention for publishing uploaded content and for allowing licensees to locate and license published content; and FIGS. 18A-18J are screenshots showing user interface screens generated by the present invention for allowing content providers to publish uploaded content and for allowing licensees to locate and license published content.

DETAILED DESCRIPTION OF THE INVENTION

The present invention relates to a system and method for online content licensing and distribution. A central website is accessible by content providers and content licensees via the Internet. Content providers are provided with a plurality of user interface screens which allow the content providers to upload content (including audio and video files, etc.) to the central website. The content providers can define licenses associated with uploaded content, designate one or more licensees for the content, and define a royalty profile including royalty distributions associated with the uploaded content. The royalty distributions could be distributed to one or more recipients, and could be expressed as percentages of collected royalties or dollar amounts. When the content has been uploaded, the present invention automatically transmits an e-mail to a designated licensee which allows the licensee to access the uploaded content and to pay for the content. When payment is processed, the content is downloadable by the licensee to the licensee's local computer. Collected payments are automatically distributed by the present invention to one or more recipients in accordance with the royalty distribution defined by the content provider. Suggested license fees can be generated by the present invention for each item of content uploaded by the content provider, and the content provider can define specific rights and/or restrictions associated with uploaded content.

Figure 1:
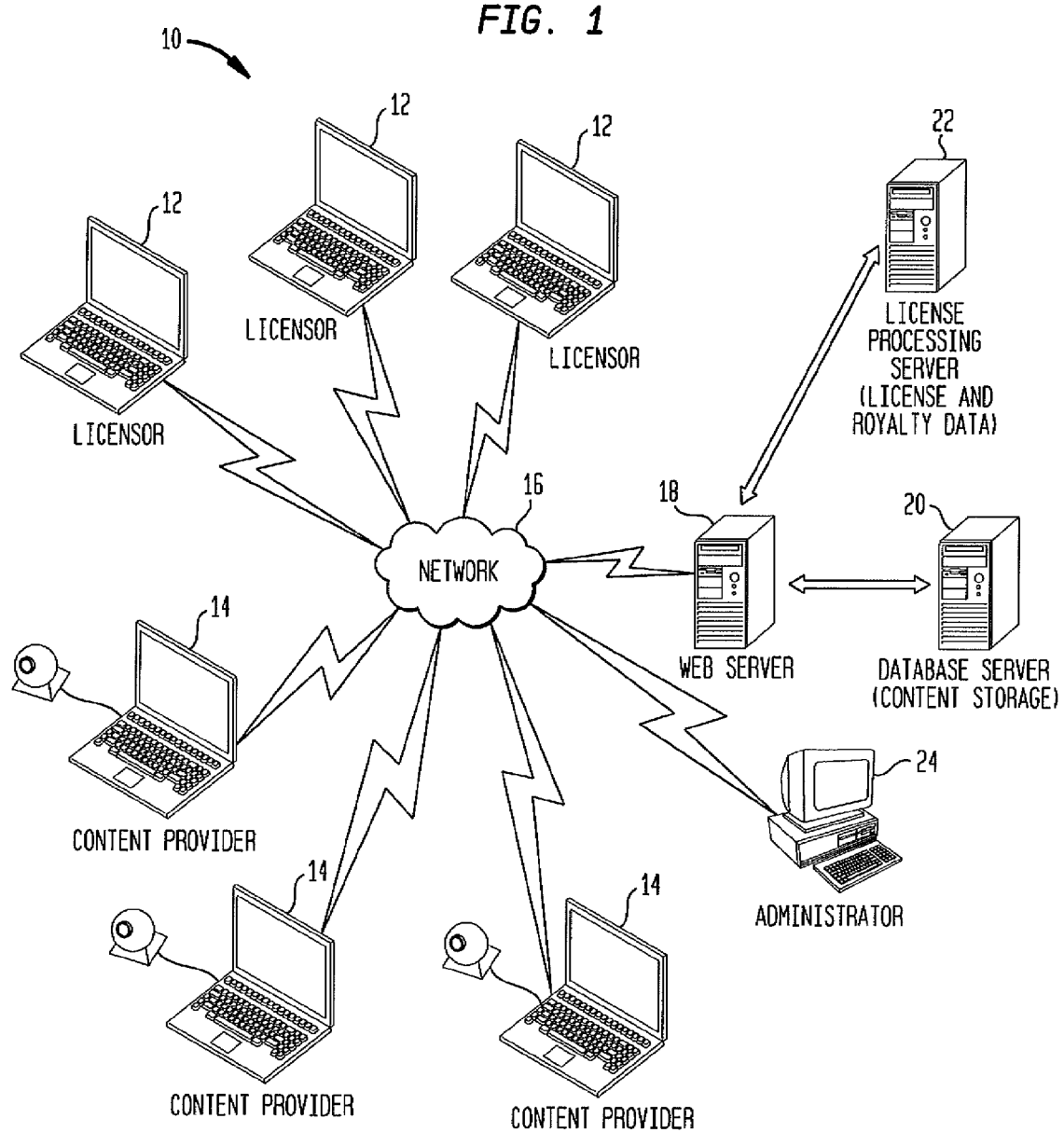
FIG. 1 is a diagram showing sample computer hardware components utilized to implement the present invention.

FIG. 1 is a diagram showing sample computer hardware components for implementing the system 10 of the present invention. The system 10 provides a central website that allows one or more licensees 12, each having a local computer system (e.g., a laptop, a desktop personal computer, personal digital assistant (PDA), handheld computer, cellular telephone, etc.) to license content provided by one or more content providers 14. The content providers 14 can provide digital content which the providers 14 desire to license and distribute to the licensees 12, including, but not limited to, digital pictures, video files, audio files, music, etc. For example, as shown in FIG. 1, each content provider 14 could have a computer system and an associated digital camera for taking pictures which each content provider 14 desires to license to the licensees 14. Such content could be for business or personal usage by the licensees 12. Each of the content providers 14 is provided with a plurality of user interface screens (as will be discussed below in greater detail) by a web server 18, which are transmitted to the content providers 14 via a network 16, such as the Internet, a local area network (LAN), a wide area network (WAN), etc., and which are accessible using a conventional web browser. The screens are utilized by the content providers 14 to upload content, to define licenses associated with each content, to designate specific licensees 12 to which to license the content, and to define royalty distributions associated with the uploaded content. For example, a content provider 14 can define a royalty distribution to be shared among three entities (e.g., two authors of the content, as well as an entity operating the present invention), which is automatically collected and distributed by the present invention when content is paid for and downloaded by a licensee 12. As will be discussed in detail below, the user interface screens allow the content providers 14 to define and manage licenses associated with uploaded content, and to define and manage royalty distributions associated with content, utilizing a simple, easy to use interface in a conventional web browser. Uploaded content can be stored in a database server 20, and license and royalty data can be stored in the license processing server 22. It is noted that any desired number of servers could be utilized to implement the present invention, utilizing any suitable computer hardware (e.g., servers with INTEL microprocessors), operating systems (e.g., LINUX, UNIX, etc.), applications (e.g., APACHE, PHP, etc.), and relational database management systems (e.g., ORACLE database system, MySQL, etc.) The servers 18-22 are programmed in accordance with the processing steps disclosed hereinbelow to provide the functionality of the present invention.

When content has been uploaded by the content providers 14 and a license has been associated with the uploaded content (initiating a license transaction), the system 10 automatically transmits an e-mail communication to designated licensees 12, alerting them to the fact that content has been uploaded and that a license transaction for the uploaded content has been initiated. Other forms of communication could be utilized, such as text messaging, Short Messaging Service (SMS), etc., without departing from the spirit or scope of the present invention. When an e-mail notification is communicated to a licensee 12, the licensee can click on a link in the e-mail, whereupon the licensee is presented with a plurality of user interface screens in the licensee's web browser which allow the user to review an invoice associated with the uploaded content and the license transaction, pay a license fee associated with the content, and download the content. Processing of invoices and royalty payments is handled by the system 10, and royalties are distributed from the license fee to one or more recipients in accordance with royalty distributions defined by the content provider. An administrator 24 can access the system 10 and the servers 18-22 to perform periodic maintenance and administration of user accounts, etc.

Figure 2:
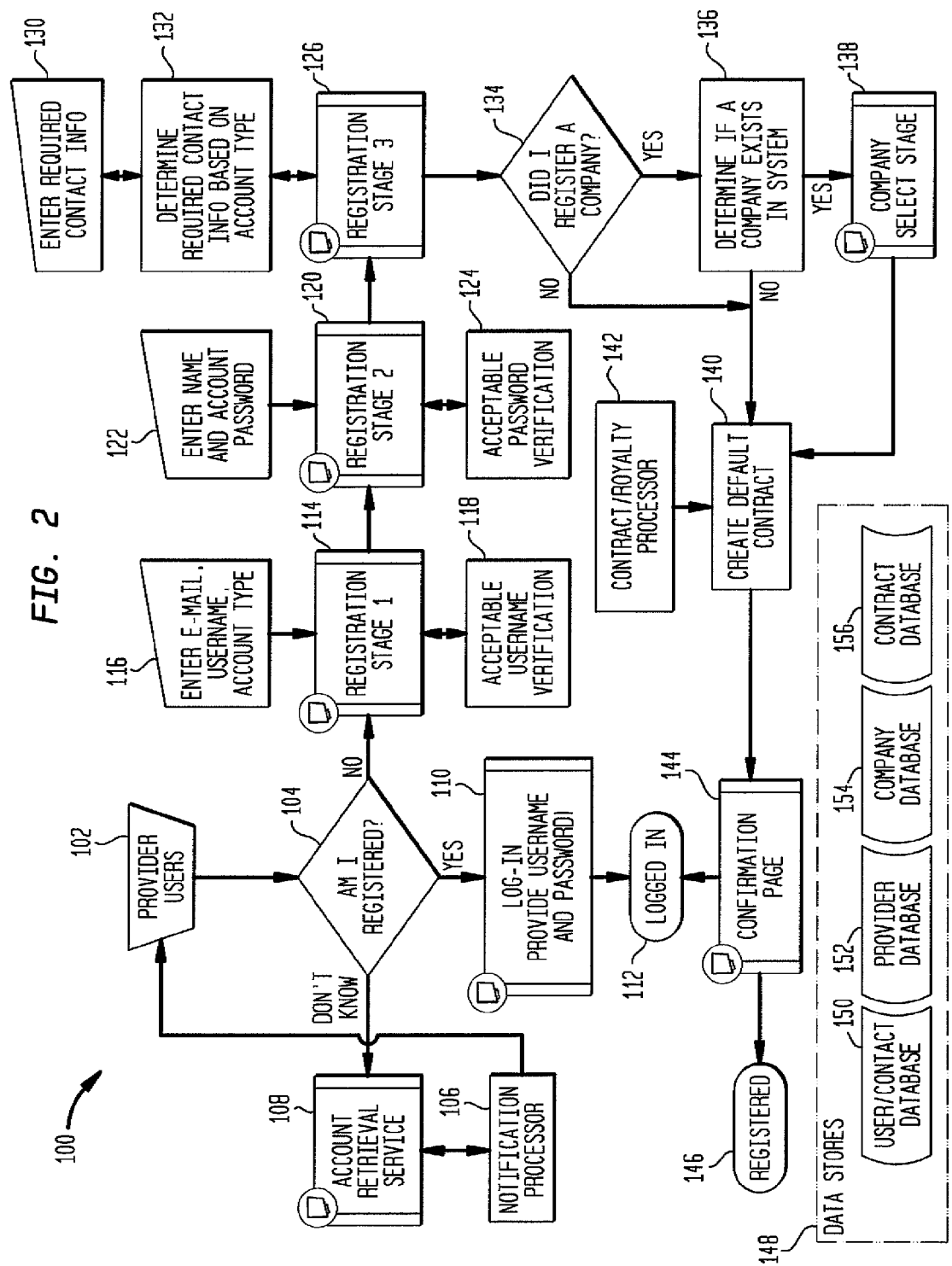
FIGS. 2-3 are flowcharts showing processing steps according to the present invention for registering users and managing user accounts.

Referring to FIGS. 2-3 and 4A-4M, shown in FIG. 2 is a flowchart of processing steps, indicated generally at 100, according to the present invention for registering users. Beginning in step 104, a determination is made as to whether a content provider 102 (e.g., one or more of the content providers 14 of FIG. 1) is registered with the present invention. If a determination cannot be made, step 108 is invoked, wherein the content provider is provided with an account retrieval service screen (as depicted in FIG. 4J) which allows the content provider to retrieve existing account information by providing a user name. In step 106, the user name provided is processed by a notification processor to determine whether a valid name for an existing account can be found. If so, an e-mail is sent to the content provider containing a user name and password. If a decision is made in step 104 that the content provider is registered with the system, step 110 occurs, wherein the content provider is presented with a log-in screen (as depicted in FIGS. 4H-4I) for allowing the content provider to enter his or her user name and password. If the user name and password are correct, the content provider is logged onto the system in step 112.

Figure 4A:
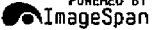
Figure 4B:
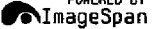
Figure 4C:
Figure 4E:

If a determination is made in step 104 that the content provider is not registered, a first registration stage occurs in step 114. In this stage, in step 116, the content provider is provided with a screen for entering an e-mail address, a user name, and an account/registration type (as depicted in FIGS. 4A-4B). In step 118, the provided user name is processed to determine whether it is acceptable (e.g., no other users of the present invention exist who are using the same user name). If the user name is not acceptable, the content provider is prompted to provide a different user name. In step 120, a second user registration stage occurs, wherein in step 122, the content provider is provided with screens for a name and an account password (as depicted in FIG. 4C). In step 124, the provided account password is processed to determine if it conforms with pre-defined rules. If the password is not acceptable, the content provider is prompted to provide a different password. In step 126, a third registration stage occurs, wherein in step 132 required contact information for the content provider is determined based upon the account type specified by the user. Then, in step 130, the content provider is provided with screens for entering the required contact information (as depicted in FIGS. 4D-4E).

In step 134, a determination is made as to whether the content provider registered a company name. If a negative determination is made, step 140 is invoked, wherein a default contract is created for the content provider. Otherwise, if a positive determination is made, step 136 occurs, wherein a determination is made as to whether a matching company exists in the system. If not, step 140 occurs. If a matching company exists, step 138 occurs, wherein the content provider is provided with a screen to select a previously-registered company (as depicted in FIG. 4F).

In step 142, the default contract created with the content provider is processed to ascertain contract terms. Then, in step 144, the content provider is provided with a confirmation screen (as depicted in FIG. 4G), indicating that the content provider has been successfully registered and logged into the system, as indicated in steps 144 and 146. Data acquired from the user during the processing steps of FIG. 2 can be stored in data stores 148, which could include a user/contract database 150, a provider database 152, a company database 154, and a contract database 156, each of which could be hosted by the database server 20 of FIG. 1, or elsewhere.

Figure 3:
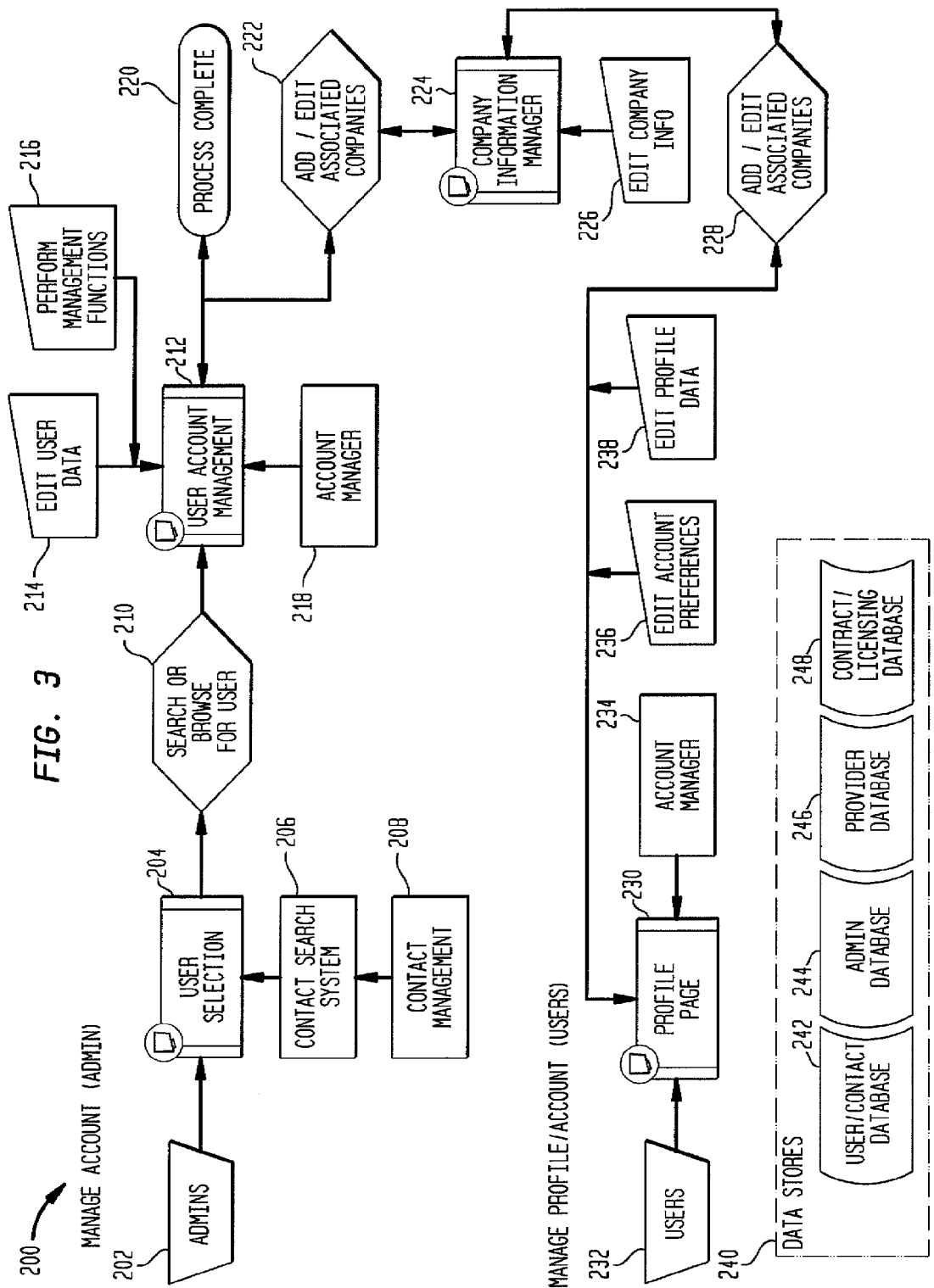

Shown in FIG. 3 is a flowchart, indicated generally at 200, for allowing an administrator and/or a content provider to manage accounts. In step 204, an administrator 202 (e.g., the administrator 24 of FIG. 1) is provided with a screen for allowing the administrator to select a user, which screen interfaces with contract search and management subsystems 206 and 208 of the present invention. In step 210, the administrator can search or browse for a user. In step 212, the administrator is provided with a user account management screen (as depicted in FIGS. 4K-4L) for allowing the administrator to edit user data in step 214 and to perform management functions in step 216. The user account management screen interfaces with an account manager subsystem in step 218 for performing these steps. If account management is complete, step 220 occurs. Optionally, in step 222, the administrator could add or edit companies associated with a user. To perform this process, the administrator is provided with a company profile management screen (as depicted in FIG. 4M), which, in step 226, allows the administrator to edit company information.

Figure 4F:
Figure 4G:
Figure 4H:
Figure 4I:
Figure 4J:
Figure 4K:
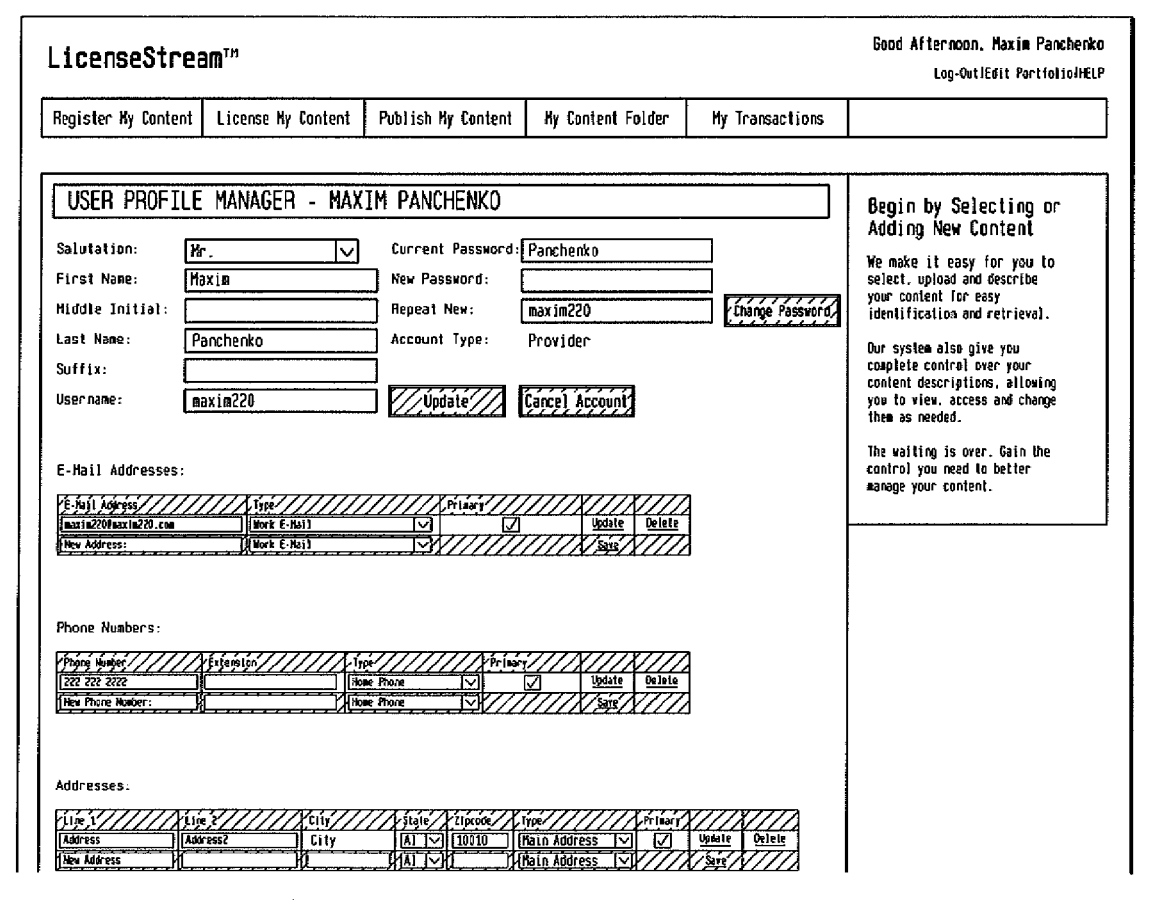
Figure 4L:
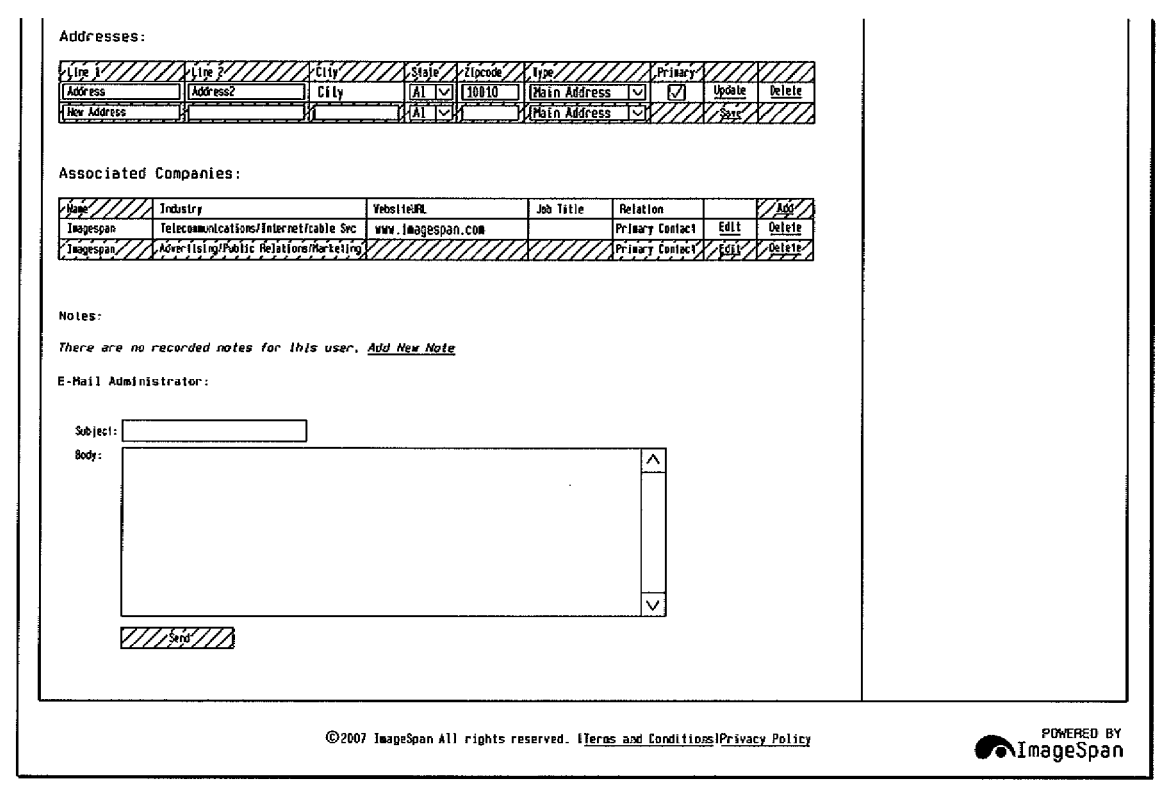
Figure 4M:
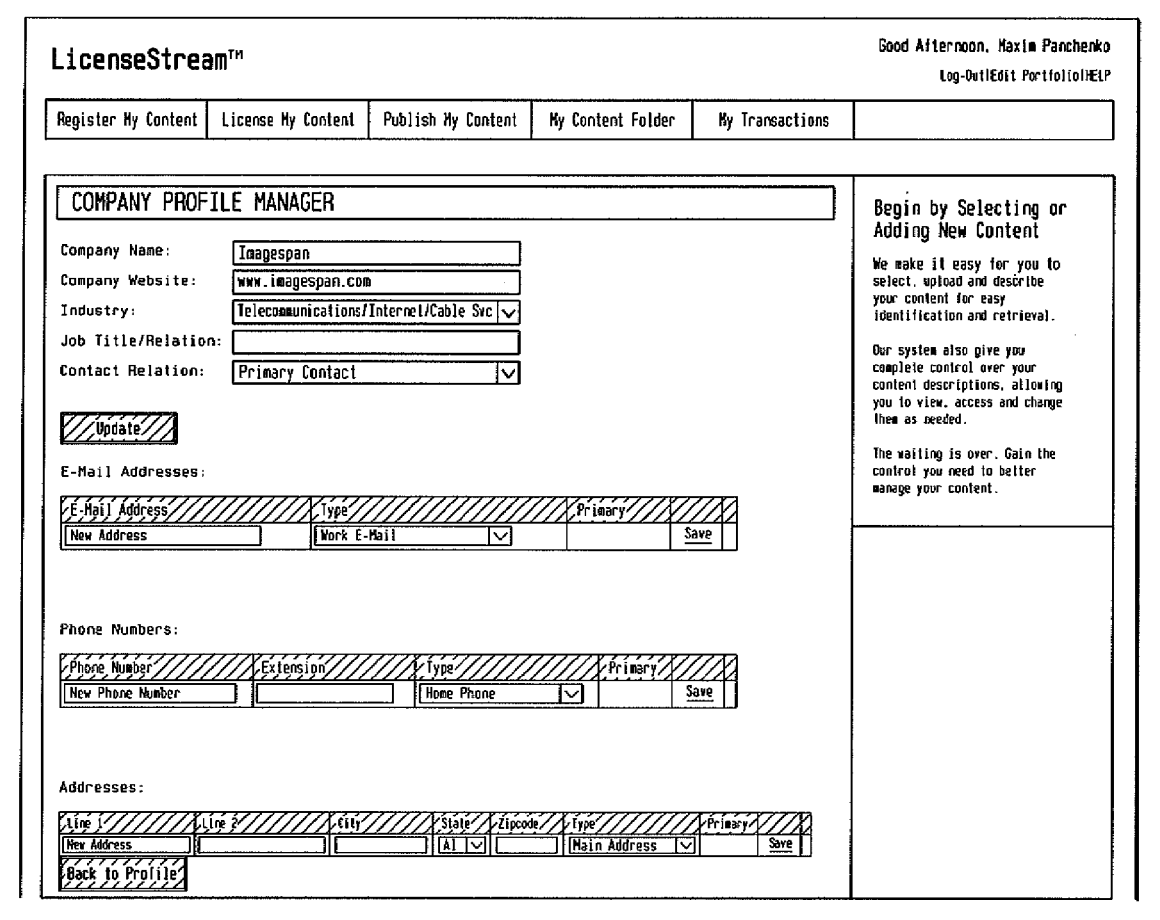

In step 230, management of user accounts by content providers 232 (e.g., by one or more of the content providers 14 of FIG. 1) can be carried out utilizing profile management screens generated by the present invention (such as the screens depicted in FIGS. 4D-4F, discussed above). In step 234, the profile management screens interface with the account management subsystem of the present invention to update account information, and allow the user to edit account preferences in step 236 and to edit profile data in step 238. Optionally, in step 228, companies associated with a content provider can be added or edited in the manner discussed above in connection with FIG. 3. The information processed by the steps of FIG. 3 could be stored in data stores 240, which could include a user/contract database 242, an administration database 244, a provider database 246, and a contract/licensing database 248, and which could be hosted by one or more of the servers discussed above in connection with FIG. 1, or elsewhere.

Figure 5:
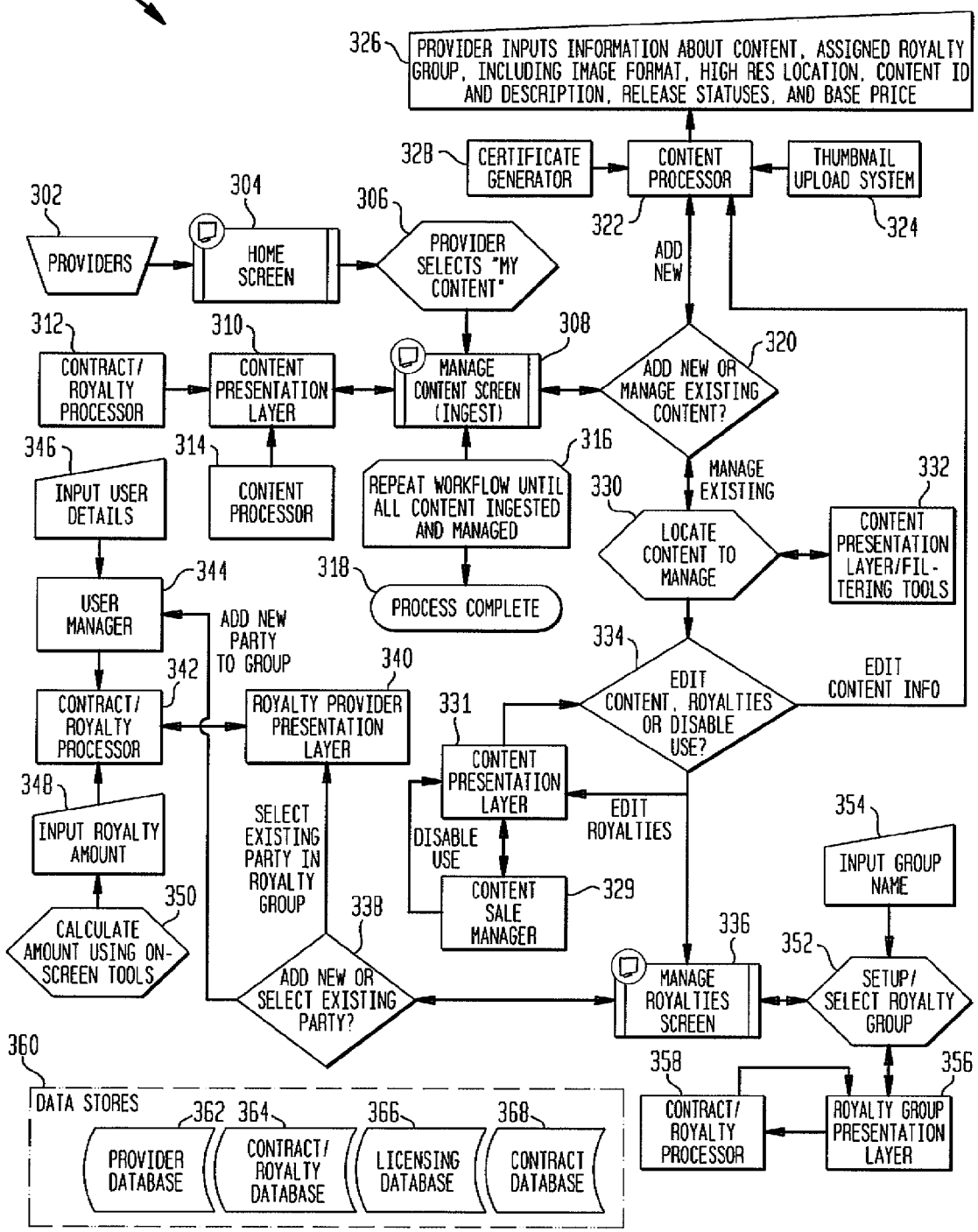
FIG. 5 is a flowchart showing processing steps according to the present invention for allowing content providers to upload and manage content, and to define royalty terms associated with uploaded content.

Referring to FIGS. 5 and 6A-6I, depicted in FIG. 5 is a flowchart showing processing steps according to the present invention, indicated generally at 300, for allowing content providers to upload and manage content, and to define royalty terms associated with uploaded content. Beginning in step 304, a content provider 302 (e.g., one or more of the content providers 14 of FIG. 1) is provided with a "home" screen which allows the user to begin uploading content. In step 306, the content provider can select a "My Content" option, whereupon the content provider is provided with content management screens (as depicted in the screenshots shown in FIGS. 6A-6D) for allowing the content provider to upload content which is stored ("ingested") by the present invention. In step 320, a determination is made as to whether the content provider wishes to upload new content, or to manage existing content. If new content is to be added, a content processor 322 is activated, wherein the provider inputs information in step 326 about the content (such as content type (picture, video clip, audio clip, etc.), file names, image formats (including, but not limited to, .JPG, .GIF, .TIFF, etc.), captions, copyright information, etc.). In this step, the content provider can also provide information about an assigned royalty "group," image location, content identifier, release statuses, and base prices. A certificate generator is activated in step 328, which generates at least one digital certificate to be used to secure uploaded content. In step 324, a thumbnail upload system is activated to allow the content provider to upload content to the present invention, through a conventional web browser.

Figure 6A:
Figure 6B:
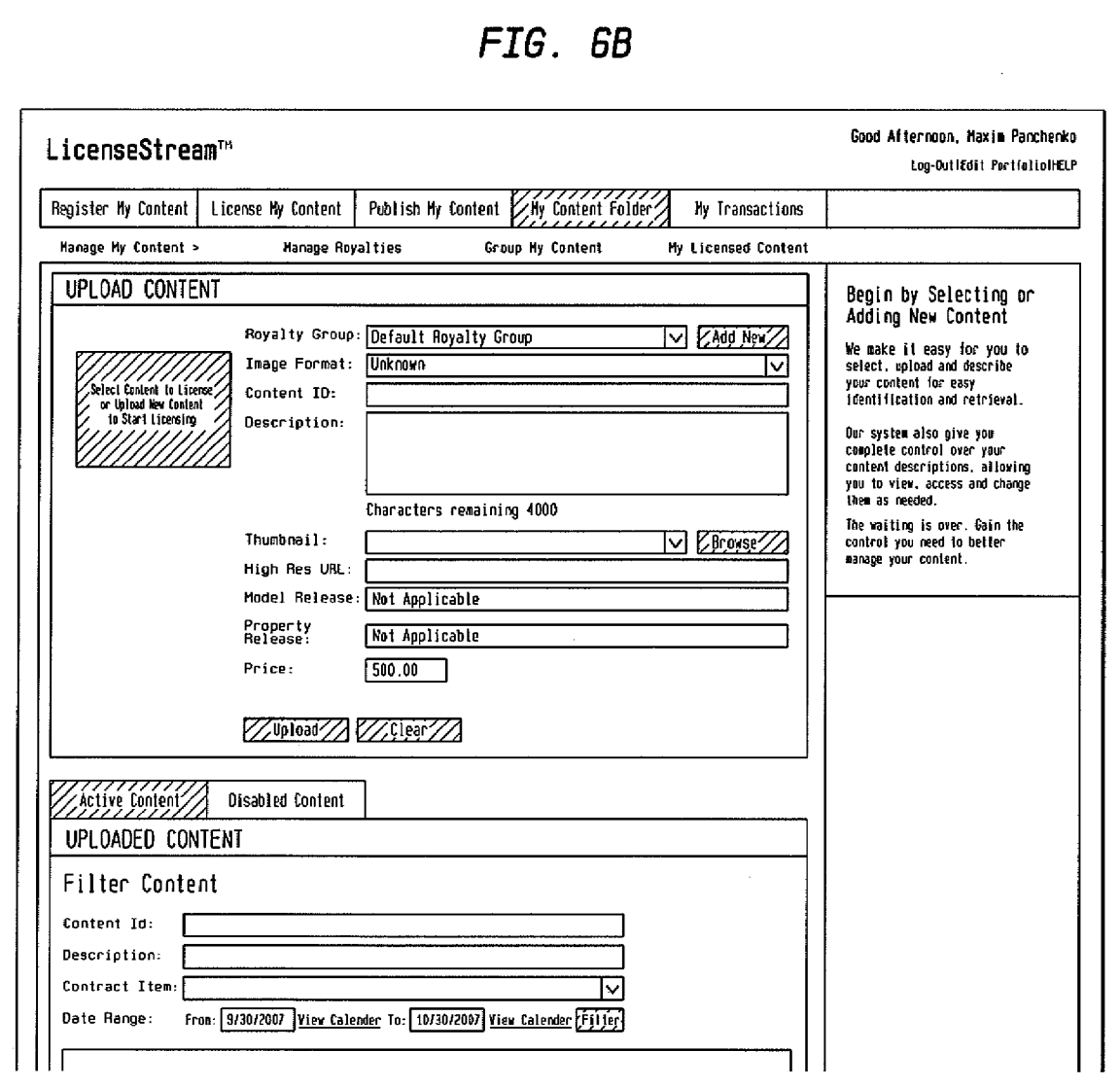
Figure 6C:
Figure 6E:
Figure 6F:
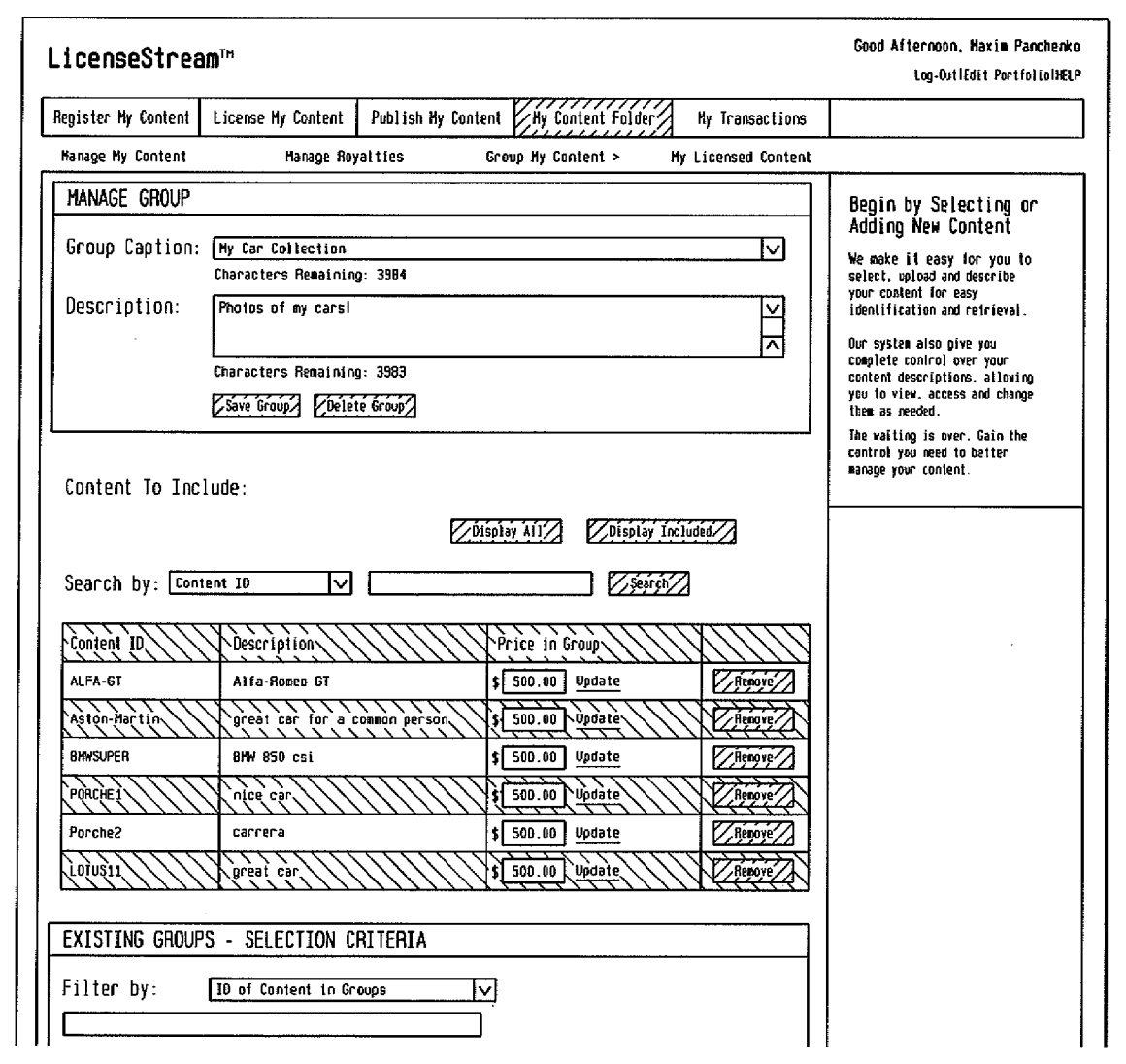
Figure 6H:

If a determination is made in step 320 that the content provider wishes to manage existing content, step 330 is invoked, wherein the content provider can locate previously-uploaded content to manage. This is achieved by invoking a content presentation layer and filtering tools in step 332, which allows the content provider to search for previously uploaded content. In step 334, a determination is made as to whether the content provider wishes to edit content, edit royalties associated with uploaded content, or to disable editing of content and royalty information. If a decision is made that the content provider wishes to edit content information, the content processor 322, discussed above, is invoked to allow the content provider to edit content information. If a determination is made that the content provider wishes to edit royalties associated with uploaded content, the content presentation layer discussed above is invoked in step 331, to allow the content provider to select specific content for which royalty information is desired to be defined, and the user is provided with screens for managing royalties (as depicted in the screenshot of FIG. 6E). If the content provider wishes to disable editing of content and royalty information, a content sale manager subsystem is invoked in 329, whereupon such uses are flagged as being prohibited for future sessions.

In step 336, the content provider can define one or more individuals to whom royalties are to be distributed for uploaded content. For example, as shown in FIG. 6E, the content provider can define royalties to be distributed to one or more individuals or entities, and can specify royalty distribution amounts, in dollars or percentages. Groups of royalty recipients could also be defined, and used to distribute royalties to members of such groups for future content. Thus, in step 338, the content provider can specify whether to add a new party (recipient) to a group of royalty recipients, or to select an existing party in a royalty group. If the content provider decides to select an existing party in a royalty group, step 340 occurs, wherein the royalty presentation layer (shown in FIG. 6F) is presented to the content provider. This presentation layer interfaces in step 342 with the contract/royalty processing subsystem to allow the content provider to input a royalty amount in step 348 and to manage users in step 344. If the content provider decides to add a new party to a royalty group, step 344 occurs, wherein user information can be specified and user details provided in step 346 can be associated with a user. The royalty amount specified in step 348 could be calculated in step 350 using an on-screen royalty calculator (shown in FIG. 6E). It is noted that the content provider could also directly specify a royalty group name in steps 352-354, without having to specify individual royalty recipients. In such circumstances, steps 356-358 are invoked, wherein the contract/royalty processing subsystems and royalty presentation layers, discussed above, are invoked to allow groups to be specified and royalties to automatically be allocated to the groups. Information generated by the processing steps shown in FIG. 5 could be stored in data stores 360, which could include a provider database 362, a contract/royalty database 364, a licensing database 366, and a contract database 368, and which could be hosted by one or more of the servers discussed above in connection with FIG. 1, or elsewhere.

Figure 7:
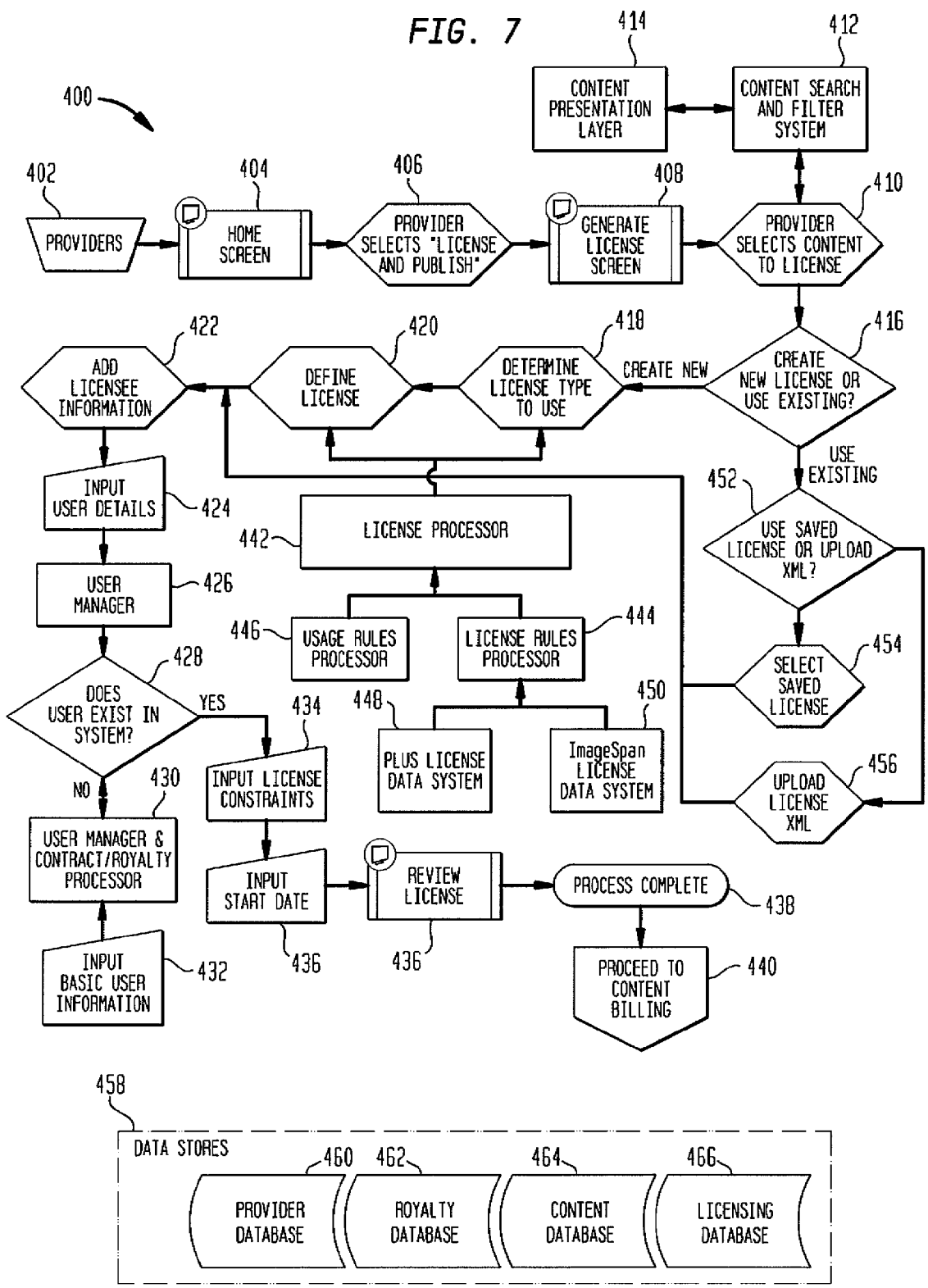
FIG. 7 is a flowchart showing processing steps according to the present invention for allowing content providers to create and manage licenses associated with uploaded content.
Figure 8B:
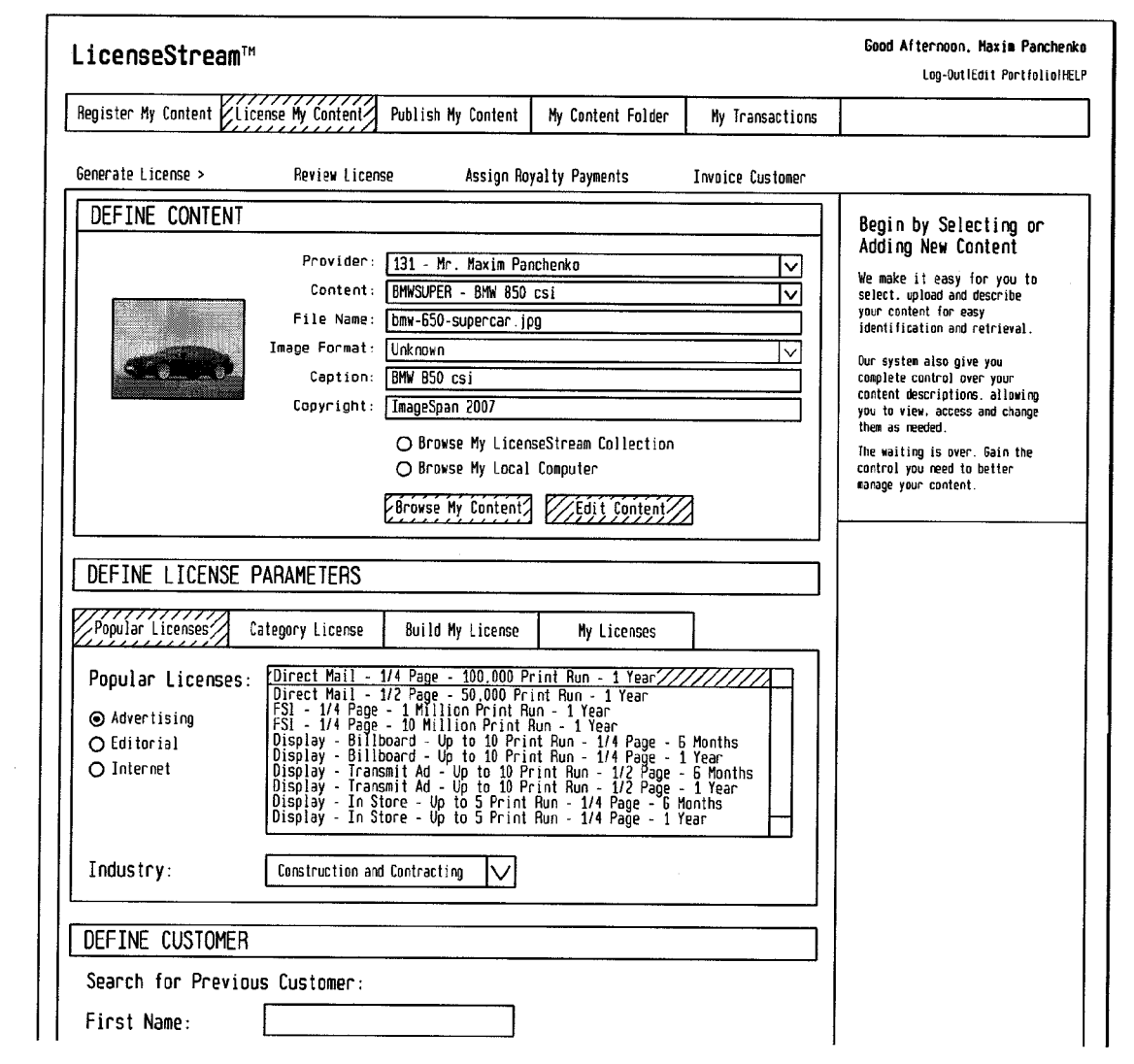

Referring to FIGS. 7 and 8A-8O, depicted in FIG. 7 is a flowchart showing processing steps according to the present invention, indicated generally at 400, for allowing content providers to create and manage licenses associated with uploaded content. Beginning in step 404, a content provider 402 (e.g., one or more of the content providers 14 of FIG. 1) is provided with a home screen, wherein in step 406, the content provider can select an option to "License and Publish" content that has been uploaded to the present invention. In step 408, the content provider is provided with license generation screens (as depicted in the screenshots of FIGS. 8A-8O). In step 410, the content provider is prompted to select content to be licensed, and can search for content using a content search and filter system in step 412 and a content presentation layer in step 414. Thus, for example, as shown in FIG. 5A, the content provider can select content to license by clicking on the "Content" pull-down screen element, or the user can upload new content by specifying a local file in the "Choose File" dialog box depicted in FIG. 8O. Also, as shown in FIG. 8A, the content provider can browse for local content on his or her computer by clicking the "Browse My Local Computer" radio button. A determination is made in step 416 as to whether the content provider desires to create a new license, or to use and existing license. If a saved license is desired, step 452 is invoked, wherein the content provider is asked whether to use a saved license or to upload a license in Extensible Markup Language (XML) format. If a saved license is desired, step 454 is invoked, wherein a saved license is selected by the content provider (as shown in FIGS. 5K-8M) and control passes to step 422, discussed below. If an uploaded license is desired, step 456 is invoked wherein the content provider uploads an XML-format license and control passes to step 422.

If the user decides to create a new license, steps 418 and 420 are invoked, wherein the content provider can define a new license utilizing a license processor 442. The license processor 442 invokes a usage rules processor 446 for allowing a user to establish usage rules pertaining to acceptable uses of uploaded content, and a license rules processor 444 for allowing the user to create license rules. The license rules processor 444 can interact with a commercially-available, automated license generation software package, such as the PLUS License Data System 448, or any other suitable third-party license generation package. Additionally, license rules can be stored in step 450 in a local license data system. For example, as shown in FIG. 8A-8E, the content provider can specify a popular license type to be applied to uploaded content, including, but not limited to, advertising licenses, editorial licenses, or Internet-based licenses. Advertising licenses could specify, among other attributes, print types, page lengths, number of print runts, and print durations. The content provider can also specify an applicable industry, and can specify a customer or licensee for the uploaded content. User-definable rules for licenses could include, but are not limited to, general constraints (such as a prohibition against using the uploaded content in connection with tobacco advertisements) and regional constraints (such as a prohibition against using the uploaded content in specific states or locations), as shown in FIG. 8J.

In steps 422-424, licensee information is provided by the content provider. This information could include the licensee's address and contact information, including one or more e-mail addresses to which notifications are sent by the present invention alerting the licensee that content has been uploaded. The provided information is then passed in step 426 to a user manager, which compares the provided information to a database of registered users of the present invention. A determination is then made in step 428 as to whether the specified user exists. If a negative determination is made, steps 430-432 are invoked, wherein basic user information is supplied by the content provider regarding the licensee. If a positive determination is made, step 434 occurs, wherein the license constraints (discussed above) are specified by the content provider 434. In step 436, the content provider specifies the start date of the license. Then, in step 436, the content provider is presented with screens that allow for reviewing of the license (as shown in FIG. 8N). When the license is reviewed and determined to be complete, steps 430-440 occur, wherein processing proceeds to content billing. The information generated in the processing steps of FIG. 7 can be stored in data stores 458, which could include a provider database 460, a royalty database 462, a content database 464, and a licensing database 466, and which can be hosted by one or more of the servers discussed above in connection with FIG. 1.

Figure 8E:
FIGS. 8A-8O are screenshots of user interface screens generated by the present invention for creating and managing licenses associated with uploaded content.
Figure 8I:
Figure 8J:
Figure 8L:
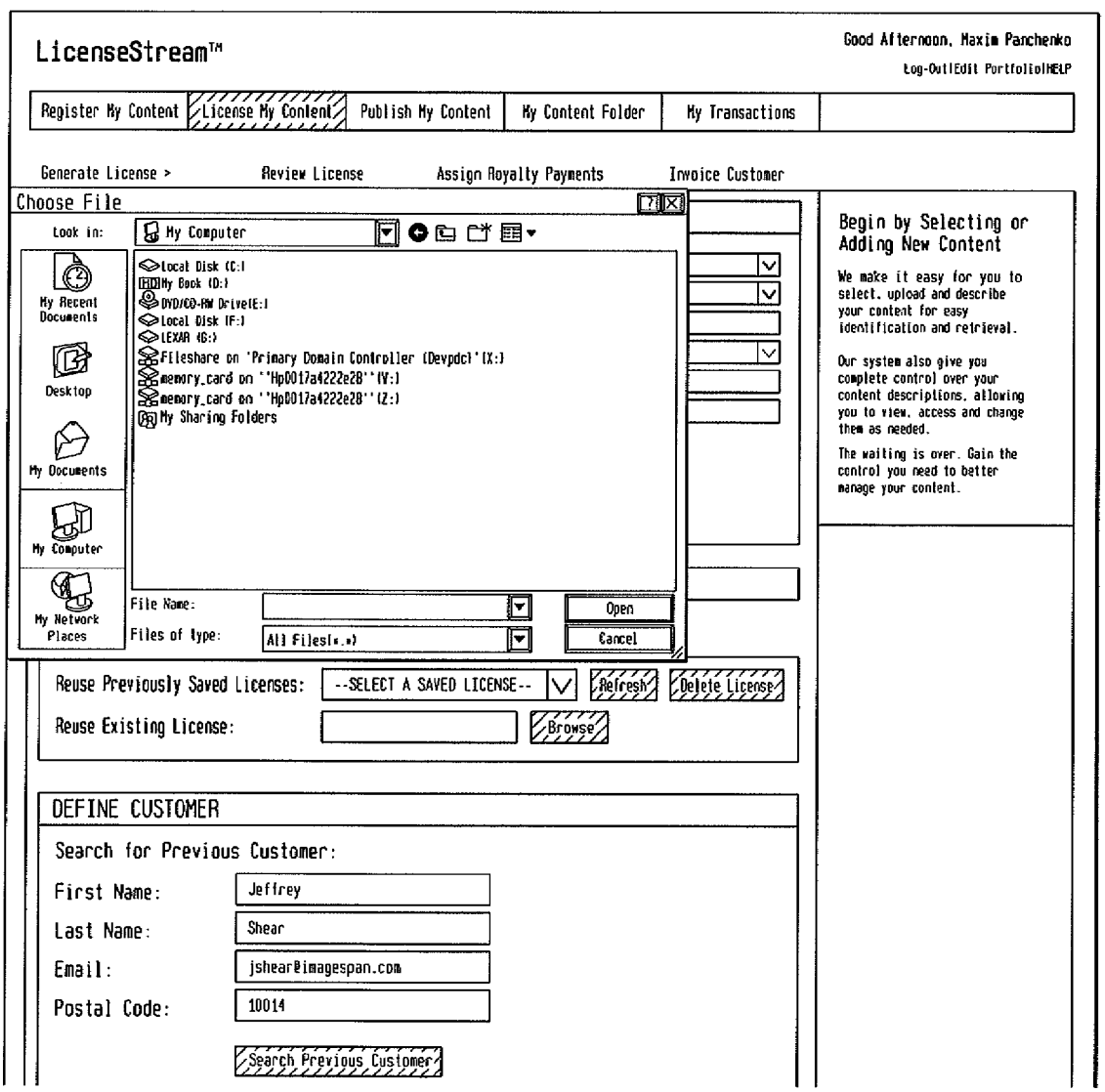
Figure 8N:
Figure 80:
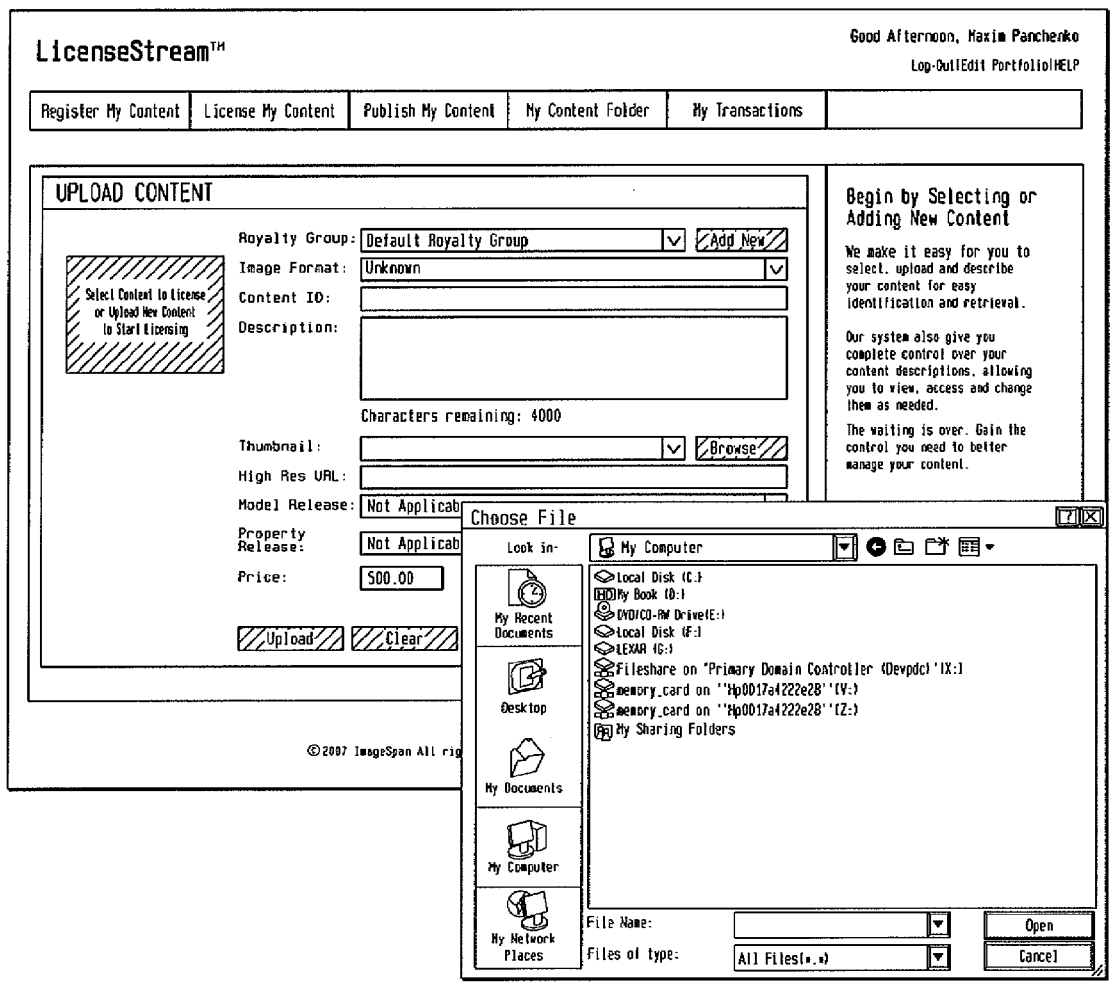

As shown in FIG. 8E, the content provider could also specify a license code and a name for a license. The license can then be created by clicking on the "Build License" button, and saved by clicking on the "Save as XML" button. Also, as shown in FIGS. 8F-8G, the content provider can create a "category" license which can be utilized to license content in specific application categories such as marketing materials, printed brochures, catalogs, annual reports, etc. The duration, applicable industry, region, and region detail can be specified by the content provider. Further, as shown in FIGS. 8H-8I, the user can create a customized license, and can specify license category, media type, media detail, distribution information, duration, print runs, applicable industry, region, and region detail information.

Figure 9B:
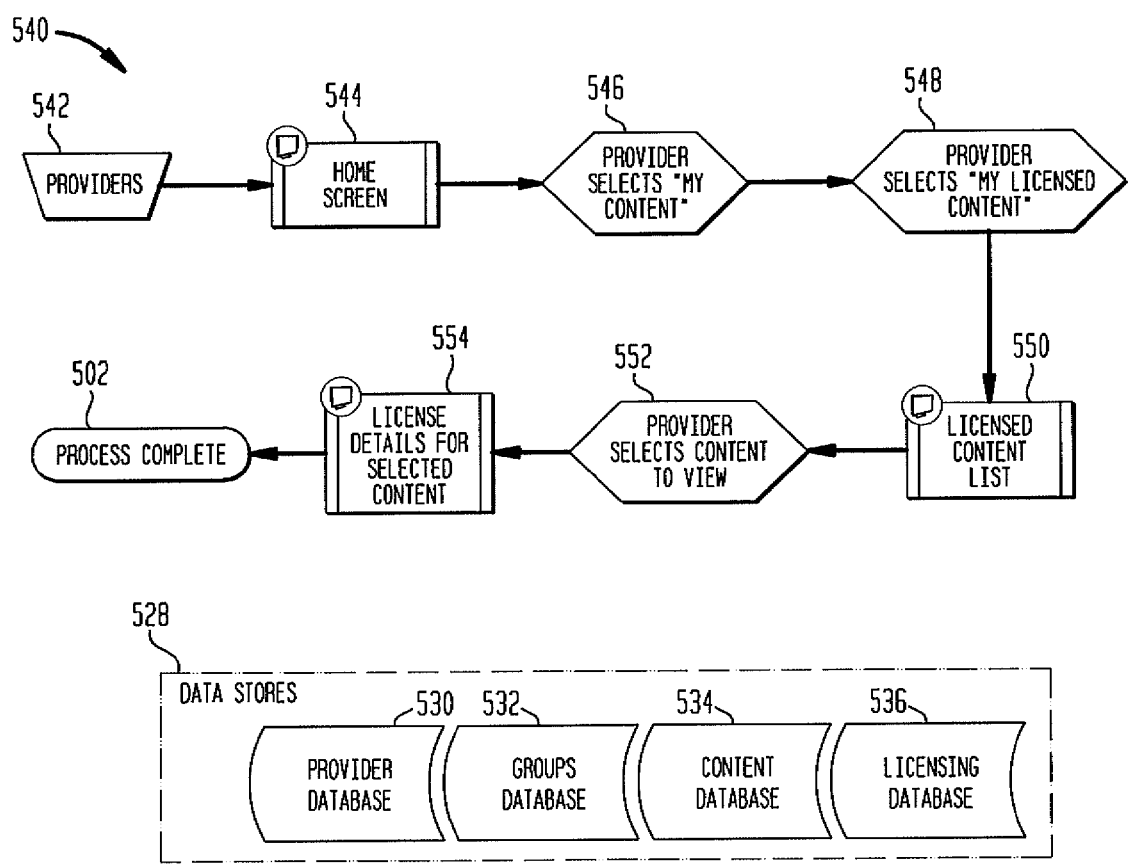

Referring now to FIGS. 9A-9B and 10A-10I, depicted in FIG. 9A is a flowchart showing processing steps according to the present invention, indicated generally at 500, for allowing content providers to group content according to one or more royalty groups, and to review licenses associated with uploaded content. Beginning in step 504, a content provider (e.g., one or more of the content providers 14 of FIG. 1), is provided with a home screen. In steps 506-508, the content provider can select an option to group content uploaded to the present invention. In step 510, the content provider is provided with a screen for allowing the content provider to define a group royalty for uploaded content, as shown in FIGS. 10D-10G. In step 512, a determination is made as to whether the content provider desires to create a new royalty group, or to manage an existing group. If the content provider desires to create a new royalty group, step 514 occurs, wherein the user is provided with a group manager and presentation layer, as shown in FIGS. 10D-10G. In step 516, the user can input a group name and a description. If the user desires to manage an existing royalty group, step 518 is invoked, wherein the content provider can search for an existing royalty group, and add or delete content associated with a royalty group. This is achieved utilizing a content group processor 520, a content processor 522, and a content presentation layer 523 for allowing the content provider to enter search criteria in step 524. In steps 525-526, the processing workflow shown in FIG. 9A is repeated so that content is defined for all desired royalty groups. As can be seen in FIGS. 10D-10G, any desired number of individuals/parties can be attributed to a royalty group, so that royalties generated by the licensing of an uploaded piece of content can be distributed across such individuals/parties in accordance with the distribution amounts or percentages defined by the content provider. A royalty calculator can be provided to the user (see FIG. 10G) to allow for calculations of royalties.

Figure 10A:
Figure 10B:
Figure 10C:
Figure 10D:
Figure 10E:
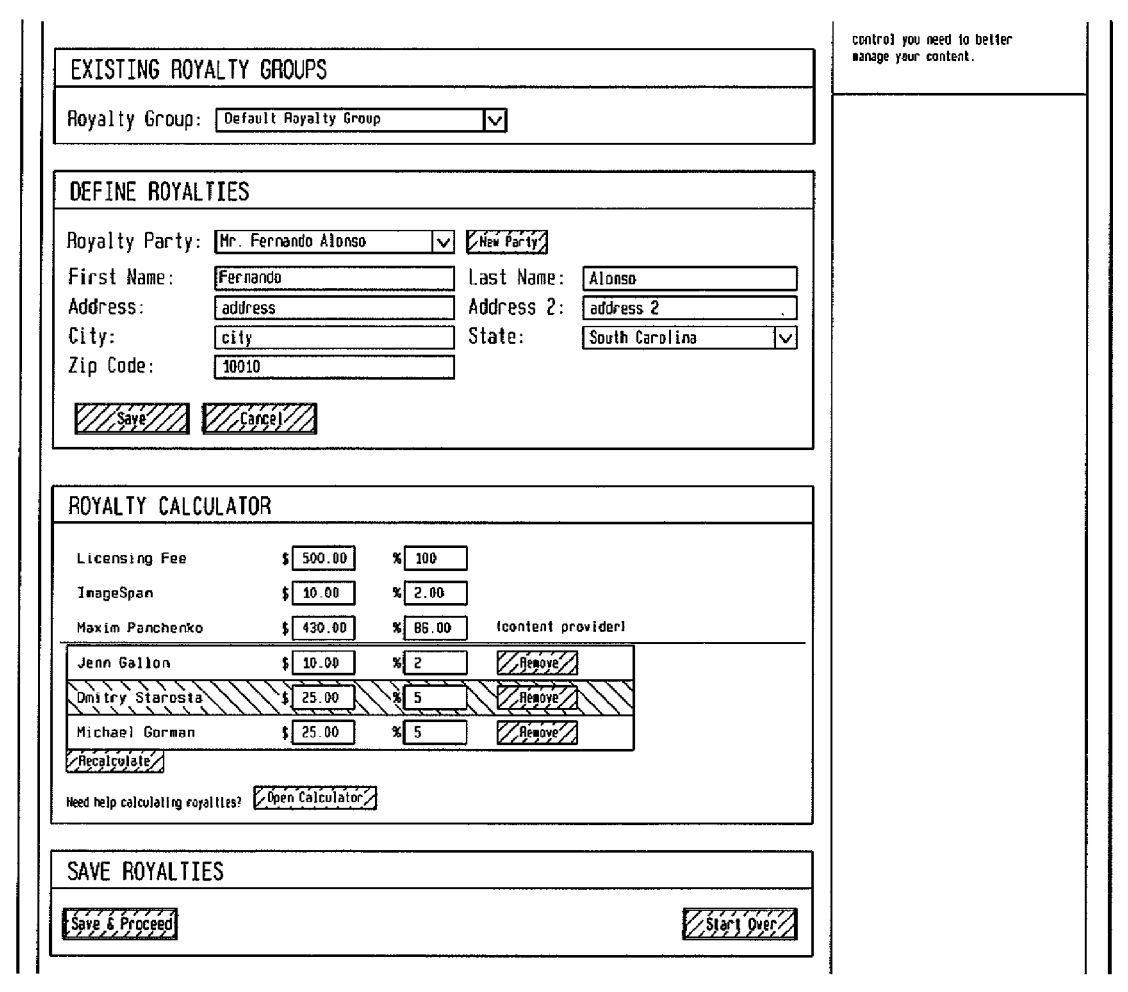
Figure 10G:
Figure 10I:

Depicted in FIG. 9B is a flowchart showing processing steps according to the present invention, indicated generally at 540, for allowing a content provider to review information about licensed content. In step 544, a content provider 542 (such as one or more of the content providers 14 of FIG. 1) is provided with a home screen, wherein in steps 546-548, the content provider can choose to review licensed content. In step 550, the content provider is provided with a list of licensed content, and in step 552, the content provider selects content to review. In step 554, the content provider is provided with detailed information about selected content, including detailed information about licensees. For example, as shown in FIGS. 10A-10C, the content provider can review detailed information about a specific license, and can locally save the license to his or her computer for future review. As shown in FIGS. 10H-10I, the content provider can review invoices to be sent to licensees to collect royalties on downloaded content. Reviewing of license information is completed in step 556. The license information provided in the processing steps of FIGS. 9A-9B can be stored in data stores 528, which could include a provider database 530, groups database 532, content database 534, and licensing database 536, and which could be hosted by one or more of the servers discussed above in connection with FIG. 1.

Figure 11A:
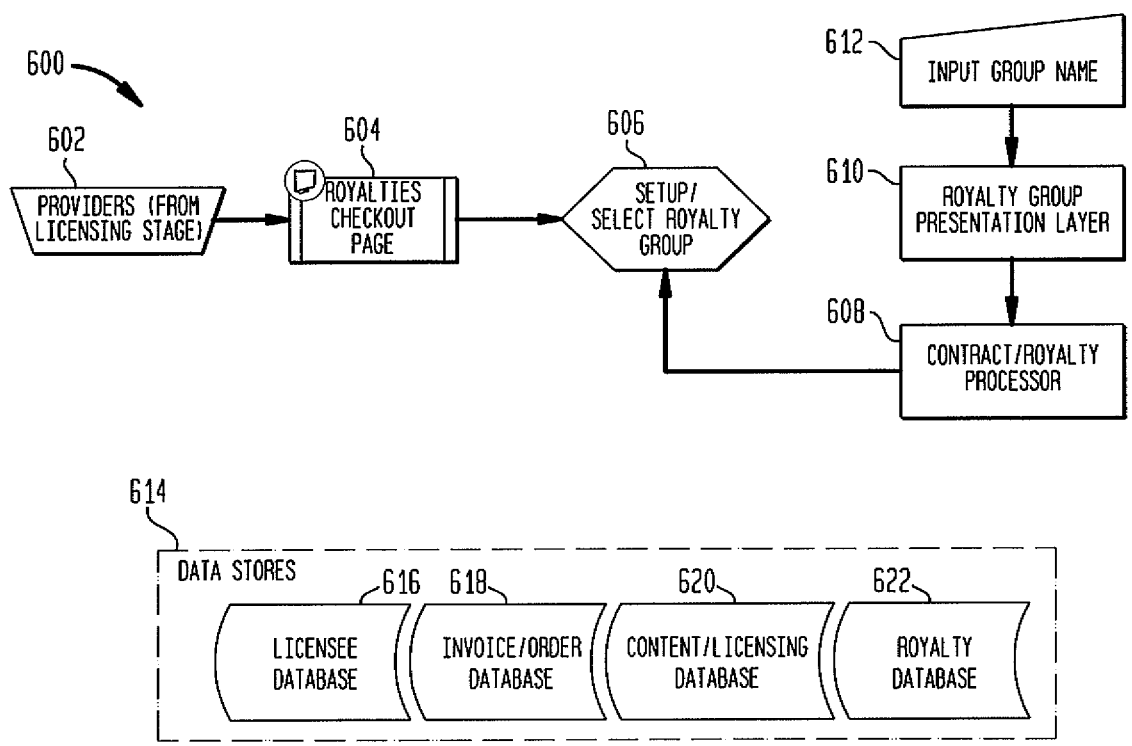
FIGS. 11A-11B are flowcharts showing processing steps according to the present invention for allowing content providers to confirm royalty information for uploaded content and for allowing licensees to pay for and download desired content.

Referring to FIG. 11A, there is shown a flowchart of processing steps according to the present invention, indicated generally at 600, for allowing content providers to confirm royalty information for uploaded content. In step 604, after a content provider 602 (e.g., one or more of the content providers 14 of FIG. 1) has uploaded desired content and created a license for the uploaded content, the content provider is provided with royalty checkout screens to confirm royalty information. In steps 606-612, the content provider can set up or select royalty groups in the manner discussed above in connection with FIGS. 9A-9B.

Figure 11B:
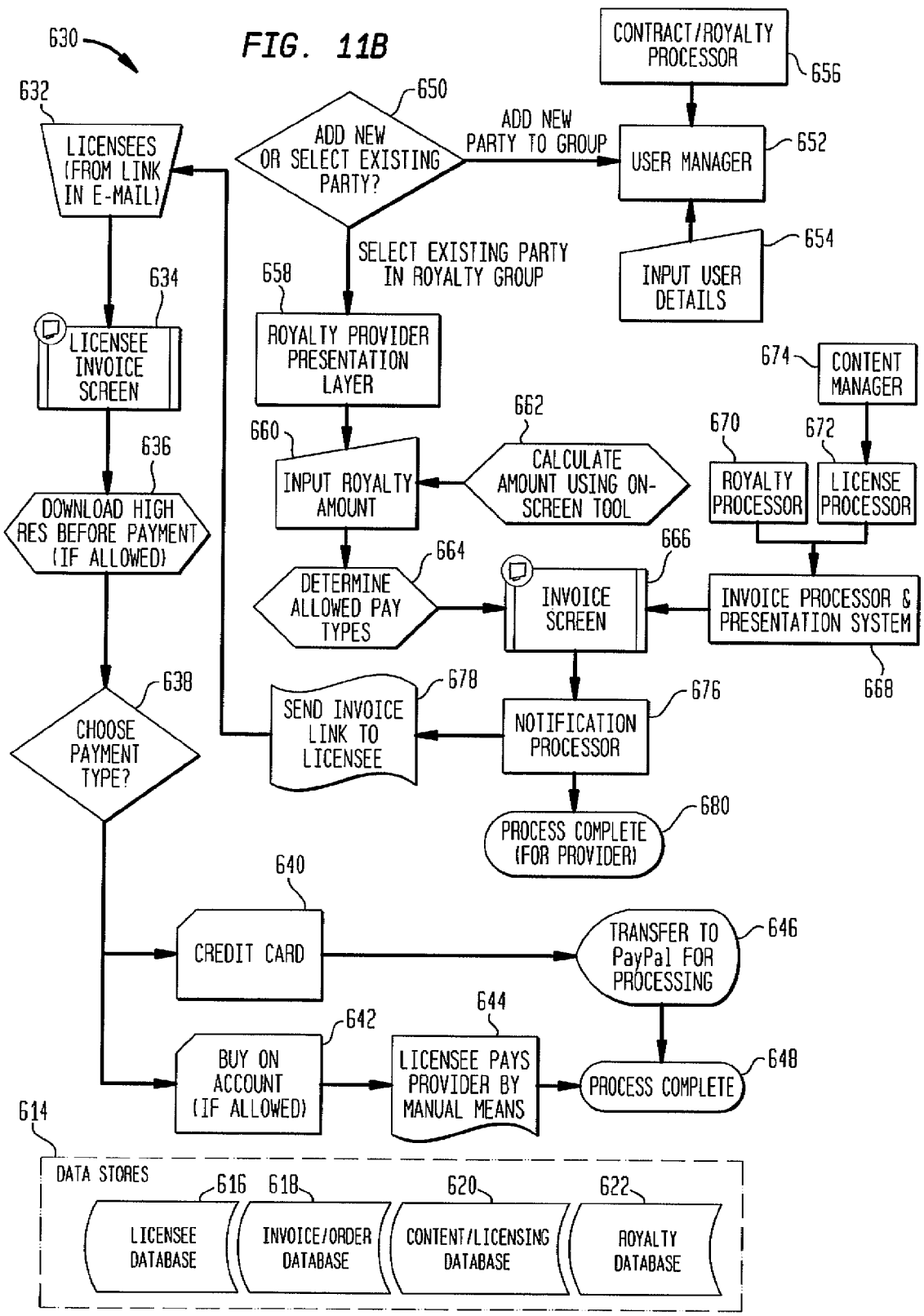
Figure 12C:

Referring to FIGS. 11B and 12A-12I, shown in FIG. 11B is a flowchart showing processing steps according to the present invention, indicated generally at 630, for publishing uploaded content notices to licensees and for allowing licensees to pay for and download desired content. In step 632, a licensee (e.g., one or more of the licensees 12 of FIG. 1) is provided with an e-mail by the present invention, which informs the licensee that content has been uploaded by a content provider and is available to be licensed. A sample e-mail notification is shown in FIG. 12A, and is generated by a notification processor in steps 676-680 when the content provider has completed uploading content and creating a license for the content, in the manner described herein. The process for creating a license, which is described above in connection with FIGS. 7-8O, is shown as steps 650-674 in FIG. 11B for purposes of illustration. A detailed description of these steps is provided above in connection with FIGS. 7-8O, and is not repeated here. Optionally, in step 664, allowed payment types can be defined by a content provider (e.g., credit card, etc.).

Figure 12D:
Figure 12E:
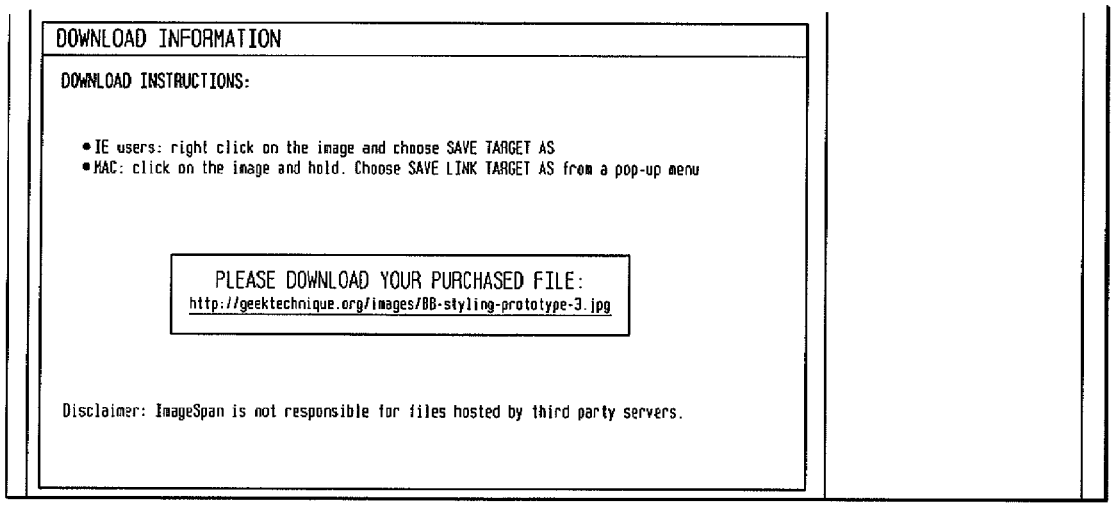
Figure 12F:
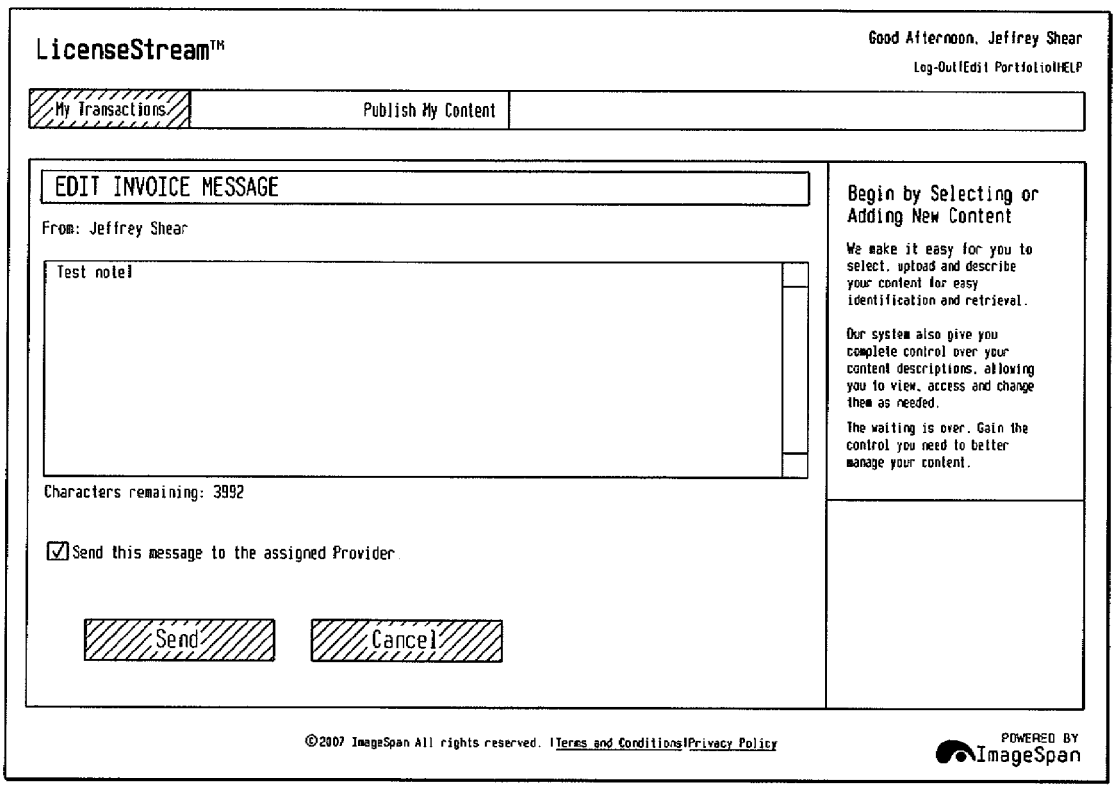

In step 634, the licensee is provided with a plurality of screens for allowing the licensee to review an invoice associated with desired content and a license transaction, pay a license fee associated with the content, and download the content, as shown in FIGS. 12B-12I. Optionally, in step 636, the licensee can download a high resolution version of the content (if permitted by a content provider) prior to paying the license fee. In step 638, the licensee can choose a type of payment (i.e., credit or debit card, or buying on account), as shown in FIGS. 12B-12C, and can also review the invoice in detail (see FIG. 12B). If the licensee chooses to pay using a credit or debit card (step 640), the licensee could be transferred in step 646 to a third-party credit or debit payment handling system, such as PayPal. This is shown in the screenshot of FIG. 12D, wherein the licensee is redirected to the PayPal website. Prior to payment, as shown in FIG. 12C, the licensee can provide a transaction password to allow for secure payment. Also, as shown in FIGS. 12C and 12F-12G, the licensee can add a note to an invoice, which could optionally be transmitted to a content provider. When payment is complete (step 648), the licensee is allowed to download the content to his or her local computer by clicking on a link to the purchased content, as shown in FIG. 12E.

Figure 12I:

If the licensee is permitted to purchase on account (step 642), the licensee pays the content provider using manual means (e.g., by check), in step 644. When payment is complete (step 648), the licensee is permitted to download purchased content in the manner described herein. Also, as shown in FIGS. 12H-12I, the licensee can review pending invoices, invoices to pay, and his or her invoice history, and can filter licenses by date range or by provider name. The present invention thus provide a flexible and easy to use system for allowing licensees to license and download content, from a variety of content providers. The information utilized in the processing steps of FIGS. 11A-11B can be stored in data stores 614, which could include a licensee database 616, an invoice/order database 618, a content/licensing database 620, and a royalty database 622, and which could be hosted by one or more of the servers discussed above in connection with FIG. 1.

Figure 13A:
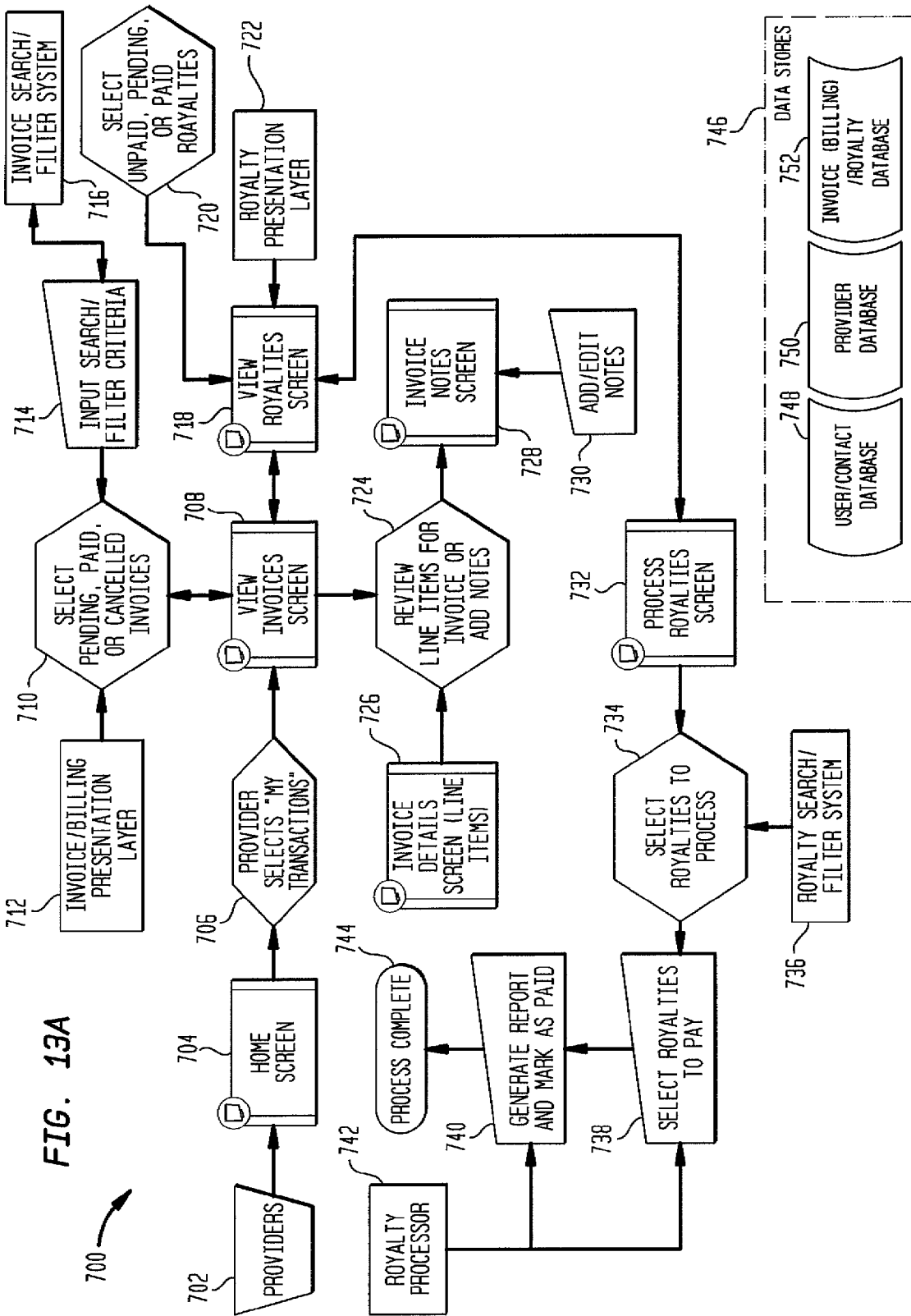
FIGS. 13A-13B are flowcharts showing processing steps according to the present invention for allowing content providers to manage invoices and royalties.

Referring to FIGS. 13A-13B and 14A-14K, shown in FIG. 13A is a flowchart of processing steps according to the present invention, indicated generally at 700, for allowing a content provider 702 (e.g., one or more of the content providers 14 of FIG. 1) to manage invoices and royalties associated with uploaded content. In step 704, the content provider is provided with a home screen. In step 706, the content provider can select a "My Transactions" option, whereupon in step 708 the content provider is provided with a plurality of screens (as shown in FIGS. 14A-14B) for managing invoices. For example, in step 710, the content provider can select pending, paid, or cancelled invoices, using a search or filter in steps 714-716. Invoices can be presented to the content provider using an invoice/billing presentation layer in step 712, as shown in FIGS. 14A-14B. In steps 724-730, the content provider can review line items for each invoice, add notes to invoices, and review or modify invoice details, as shown in FIGS. 14C-14D. In steps 718 and 732, the content provider can review and modify royalty information using a plurality of screens, as shown in FIGS. 14E-14K. Using these screens, in steps 734-736, the content provider can select royalties to process, and in step 738, the content provider can select royalties to be paid. In step 740, the content provider can generate a report of royalties, and can mark certain royalties as having been paid or unpaid (see FIGS. 14I-14K). Updated royalty information can be processed in step 742.

Figure 13B:
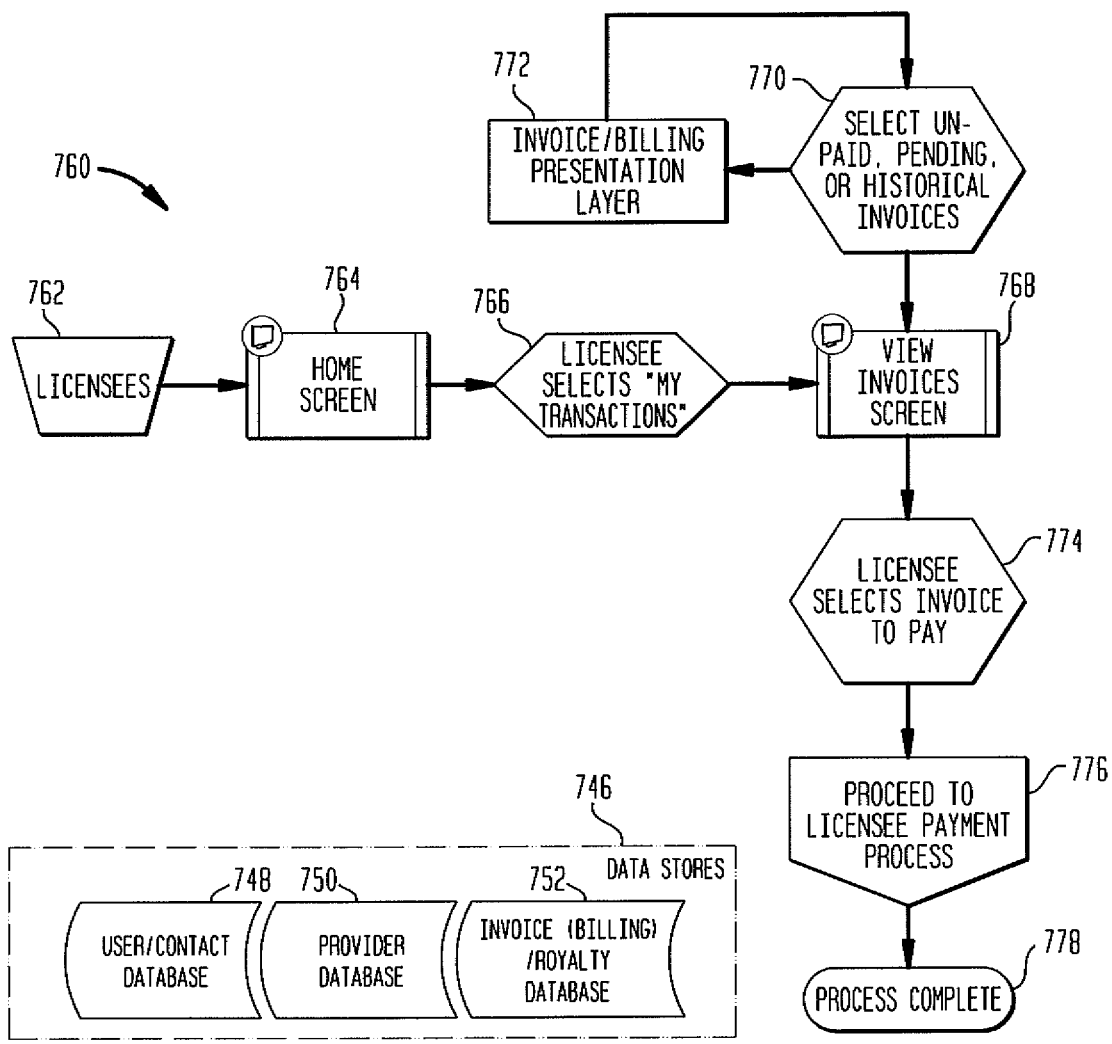
Figure 14B:
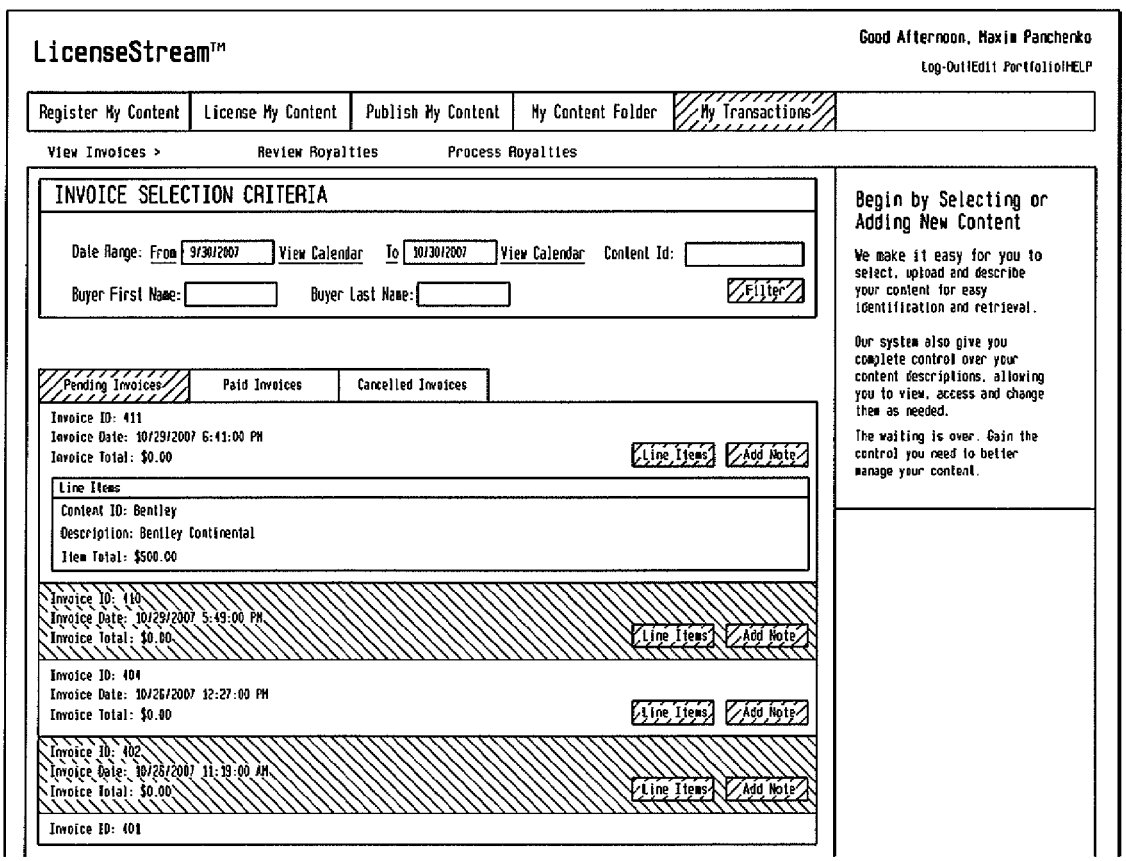
Figure 14C:
Figure 14F:
Figure 14G:
Figure 14H:
Figure 14K:

Shown in FIG. 13B is a flowchart showing processing steps according to the present invention, indicated generally at 760, for allowing a licensee 762 (e.g., one or more of the licensees 12 discussed above in connection with FIG. 1), to manage licenses. In step 764, the licensee is provided with a home screen, and in step 766, the licensee can select a "My Transactions" option, whereupon in step 768 the licensee is provided with a screen summarizing the licensee's invoices. In step 770, the licensee can select unpaid, pending, or historical invoices to view, using an invoice/billing presentation layer in step 772. In step 774, the licensee can select invoices to pay, and in step 766, the licensee can proceed to a payment process, such as the payment processes discussed above in connection with FIGS. 11A-11B. In step 778, processing completes. The information generated in the processing steps of FIGS. 13A-13B can be stored in data stores 746, which could include a user/contract database 748, a provider database 750, and an invoice/royalty database 752, and which could be hosted on one or more of the servers discussed above in connection with FIG. 1, or elsewhere.

FIG. 15 is a flowchart showing processing steps according to the present invention, indicated generally at 800, for allowing content providers to define and collect royalties for content. In step 804, a content provider 802 (e.g., one or more of the content providers 14 of FIG. 1) creates a royalty profile by identifying at least one royalty recipient and a percentage of royalties to be allocated to each recipient. In step 806, the content provider assigns selected uploaded content to the royalty profile. One or more items of content (e.g., an uploaded picture, movie file, audio file, etc.) could be allocated to the profile. In step 808, a license transaction is initiated, wherein a designated licensee is alerted to the presence of uploaded content as described hereinabove, and enters into a license agreement utilizing the present invention. Optionally, in step 810, a determination is made as to whether the content provider wishes to update a royalty profile, e.g., to add a new royalty recipient, delete a royalty recipient, or change royalty percentages associated with recipients. If so, steps 804-806 are repeated so that changes can be made by the content provider. In step 812, a determination is made as to whether the license transaction has been executed. If the license transaction has not been executed, processing ends. Optionally, the present invention could be programmed to wait a predetermined period of time during which to monitor for execution of the license transaction.

If a positive determination is made (i.e., the license transaction has been executed), step 814 occurs, wherein a record is created of a payable royalty for each royalty recipient. Then, in step 816, a determination is made as to whether a license fee has been received by the present invention. If not, step 818 occurs, wherein the present invention waits for receipt of a license fee. If a license fee has been received, step 820 occurs, wherein royalty payments are automatically distributed from the license fee to each royalty recipient, in accordance with the percentages defined in the royalty profile. Such payments could be made in automated batches which are processed on a timed (e.g., monthly) basis, and they could be reviewed and approved by a content provider using a web page prior to receipt. Once all royalty payments have been paid, processing ends.

It is noted that the present invention could be programmed to generate a unique content identifier for each piece of content uploaded to the present invention. Such an identifier could be used to protect content by requiring all license transactions (and other associated transactions) to be linked to the content. Also, the usage of identifiers allows content that is unmarked to be quickly detected by querying the present invention. Additionally, third-party transactional enforcement systems/entities could operate with the present invention to identify illegal usage of content by "crawling" the Internet and/or monitoring broadcasts (e.g., cable/satellite) and comparing located content to content licensed by the present invention.

It is also noted that the present invention could allow content providers to define specific rights and/or restrictions associated with uploaded content (including a specific piece of content, or a collection of content), which could form part of the license agreement. Such rights and/or restrictions could be stored as profiles associated with content, which could be updated as necessary when new content is uploaded. Further, when a profile is created, each piece of content uploaded could be associated with the profile, such that the rights and/or restrictions of that profile are automatically attributed to the uploaded content. Content could be grouped for the purpose of developing derivative content (which could also have the same rights and/or restrictions as the original content). For example, if an item is grouped with other content, a rule could be established such that the item can only be licensed if there are no violations of any rights of the remaining items in the group. Also, a rule could be established such that once a group has been licensed, then all items in the group will inherit new license terms associated with the group. Still further, a rule could be created such that each time a license is generated, the license terms become part of the rights and/or restrictions profile. In such circumstances, if an exclusive license is granted, an additional restriction could be generated which prohibits future licensing of the content (i.e., to other parties) during the period of exclusivity.

It is also noted that the licensing process of the present invention could initiated using an external software application (or desktop widget set) which allows a user to select content on a local computer or network, provide basic details as to the content (or, optionally, license and/or royalty terms), and click a "License My Content" button, wherein the user is automatically directed to the present invention to complete the licensing process. Any information provided in the external software application (or widget set) could be automatically pushed to the present invention to populate one or more of the screens of the present invention. Such an arrangement allows for the quick and easy gathering of local content.

FIG. 16 is a flowchart showing processing steps according to the present invention, indicated generally at 900, for suggesting a license fee for an item of content uploaded by a content provider. The process 900 includes base price sub-process 902 and specific license parameter adjustment sub-process 918. The base price sub-process 902 calculates a base price for uploaded content based upon usage and media type information associated with the uploaded content, as well as license exclusivity (if any). In step 904, a usage category associated with the uploaded content is determined. Usage categories could include, but are not limited to, usage in advertising, editorials, and in connection with products. In step 906, a usage sub-category associated with the uploaded content is determined. Such sub-categories could include, but are not limited to, usage in connection with points of purchase, book publishing, and merchandising. In step 908, a specific content usage is determined. Specific usages could include, but are not limited to, displays, textbooks, and address books. In step 910, a media type associated with the uploaded content is determined. Such types could include, but are not limited to, printed and electronic media. In step 912, the usage category, usage sub-category, specific usage, and media type are used to calculate a base price for the uploaded content. This could be accomplished by querying a database having pre-defined base prices associated with usage categories, sub-categories, specific usages, and media types, and retrieving a matching base price. In step 914, a determination is made as to whether a license associated with the uploaded content is exclusive. If so, step 916 occurs, wherein the base price is increased by a predetermined amount.

Once the base price has been calculated, the specific license parameter adjustment sub-process 918 occurs. This process allows the base price to be adjusted to reflect specific terms and conditions of a license associated with the uploaded content. In step 920, a specific license parameter is determined. Such a parameter could include, but is not limited to, a licensed territory, a licensed industry, license duration, length of print run (for printed material), number of licensed displays (for electronic media), size of content on a page, location of content within a publication (e.g., on a cover page), and location of content on a web page (e.g., on a home page). In step 922, a pre-defined multiplier is associated with the specific license parameter. Then, in step 924, a determination is made as to whether additional license parameters should be processed. If so, steps 920-922 are repeated to process the additional license parameters. Otherwise, in step 926, all multipliers are added to produce a total multiplier. In step 928, the base price calculated by the base pricing sub-process 902 is multiplied by the total multiplier to produce a suggested license fee for the content provider. The content provider can then accept the suggested license fee, modify it, or specify a new license fee, if desired.

The license fee suggested by the present invention could be applied to multiple items of content, if such items are licensed under the same license agreement. Additionally, each item of content could be assigned its own suggested license fee, which could be added with other suggested license fees to produce an aggregate license fee for an entire transaction. Additionally, license fees could be produced for each instance of a permitted usage of an item of content, and could be automatically collected by the present invention.

The usage categories, sub-categories, specific usages, and media type information utilized in the steps of FIG. 16, as well as the specific license parameters, could be provided by allowing the user to select a pre-defined license type. Examples include, but are not limited to, a popular license (wherein pre-defined parameters associated with popular advertising, editorial, or Internet-based licenses can be automatically provided through a single-click selection of this license type by the user), a category license (wherein a user can select a broad category of usages based upon common license combinations, and the user is guided through the selection of categories, sub-categories, and specific usages), a customized license (wherein the user creates a user-defined license and is guided through the selection of category, sub-category, specific usage, media type, and specific license parameters), and stored licenses (wherein the user loads a previously-generated license which is stored by the present invention, and the use category, sub-category, specific usage, media type, and specific license parameters are automatically supplied by the present invention).

It is further noted that the present invention could allow content providers to publish their content so that it can be located on public web sites, such as Google, as well as private web sites that could be associated with the present invention for purposes of marketing and/or advertising of content. In such circumstances, a content provider could select an item of content to be published, and then select a licensing "model" to be associated with the content. Once the content has been published, an individual who locates the content can click on it to obtain more information and licensing of the content. A potential licensee could then be directed to the present invention, and can utilize the present invention to license and download the content. The publishing feature of the present invention is discussed below in connection with FIGS. 17 and 18A-18J.

Figure 18A:
Figure 18B:
Figure 18F:

Shown in FIG. 17 is a flowchart of processing steps according to the present invention, indicated generally at 1000, for allowing a content provider 1002 (e.g., one or more of the content providers 14 of FIG. 1) to publish content uploaded by the content provider to the present invention, and for allowing licensees to search for, license, and download the content. In step 1004, the content provider is provided with a home screen (as shown in FIG. 18A) for allowing the content provider to select active content. This could be accomplished in step 1006 by selecting a "My Content Folder" tab and clicking on desired content to publish which has been uploaded to the present invention, as shown in FIG. 18A. In steps 1008-1018, the user is provided with a plurality of user interface screens (shown in FIGS. 18B-18D), which allow the user to manage content to be published, identify a target publishing host (e.g., Google Base) at which the content is to be published, and to identify a publishing license model. As shown in FIG. 18B, the user can supply a caption for the content to be published, a description of the content, search keywords to be supplied to a search engine for allowing individuals to search for content, and optional information such as the subject of the uploaded content and a size of the uploaded content. Steps 1008-1014 are repeated until all desired content to be published has been identified by the user and publishing details have been provided. As shown in FIGS. 18C-18D, the user can selectively designate one or more uploaded items for publication by choosing from a list of uploaded content and clicking a "Select" button (FIG. 18D) to select an item to be published. An item which was previously identified for publication can be unselect by clicking an "Unpublish" button.

In step 1020, a content publishing processor is activated to publish all content selected by the content provider. Such publication can occur through a third-party publication service (e.g., physical publications (books, magazines, periodicals, etc.) or electronically through the Internet. If a third-party publication service is desired, step 1024 occurs, wherein the content to be published, along with publication details, is sent to the third party publication service (e.g., via a company web site). If publication via the Internet is desired, step 1026 occurs, wherein the content processor transmits the content and associated publication details to a searchable Internet content base (e.g., Google Base). Both types of publication can occur independently or simultaneously. When publication is complete, step 1022 occurs.

Figure 18G:
Figure 18H:

In step 1028, licensees (e.g., one or more of the licensees 12 of FIG. 1) can search for published content. This search could occur by electronically searching through a third-party content repository, or by searching through an Internet-based content base (e.g., Google Base). When the search is complete, search results are presented to the user in step 1030, as shown in FIG. 18E. In step 1032, the licensee selects desired content appearing in the search results. In step 1034, a determination is made as to whether the content is managed by the present invention. If so, step 1036 occurs, wherein the user is presented with a plurality of user interface screens for allowing the user to enter into a license agreement and to download the content (as shown in FIGS. 18F-18I). In step 1038, the licensee can provide details including billing address and contact information (see FIG. 18I). In step 1040, the licensee can provide license details and can create a license. The licensee can define a usage category (e.g., advertising), a usage type (e.g., display advertising), details about the usage, usage duration, target industry in which the content will be used, as well as information about geographical regions of use (see FIG. 18G). In step 1042, the provided information is processed by a license and transaction processor to create the license between the content provider and the licensee. As shown in FIG. 18G, a proprietary license code is generated by the present invention and is associated with the license. In step 1044 transaction details, including a summary of the license (see FIG. 18H) and an invoice (see FIG. 18J), are provided to the user, and upon paying a license fee associated with the content, the user is then allowed to download the content. When the content has been downloaded, processing is completed in step 1046. The information processed in FIG. 17 could be stored in data stores 1048, which could include a provider database 1050, a contract/royalty database 1052, a licensing database 1054, and a contract database 1056.

Having thus described the invention in detail, it is to be understood that the foregoing description is not intended to limit the spirit or scope thereof. What is desired to be protected by Letters Patent is set forth in the appended claims.

What is claimed is:

1. A method for online licensing and distribution of content, comprising:

uploading content to a central website;

associating a license agreement with the content using the central website;

creating a royalty profile by identifying at least one royalty recipient and a royalty percentage for the at least one royalty recipient;

storing the royalty profile at the central website;

processing the content at the central website to determine at least one of a usage category, a usage sub-category, a specific content usage, or a media type associated with the content;

calculating at the central website a suggested license fee for the content based upon the at least one of the usage category, the usage sub-category, the specific content usage, or the media type of the content determined by the central website;

receiving the suggested license fee for the content from the central website;

identifying a licensee of the content using the central website, wherein the central website notifies the licensee that the content is available for download from the central website; and receiving the suggested license fee when the content is licensed and downloaded by the licensee from the central website, wherein royalty fees are distributed from the suggested license fee in accordance with the royalty profile stored at the central website.

2. The method of claim 1, wherein the step of associating the license agreement to the content further comprises creating a new license agreement using the central website.

3. The method of claim 1, wherein the step of associating the license agreement to the content further comprises selecting a pre-defined license agreement stored at the central web site.

4. The method of claim 1, further comprising defining usage restrictions for the content and storing the usage restrictions at the central website.

5. The method of claim 1, further comprising grouping the content with additional content uploaded to the central website.

6. The method of claim 5, further comprising associating the additional content with the license agreement.

7. The method of claim 6, further comprising associating the additional content with the royalty profile.

8. The method of claim 7, further comprising receiving additional license fees when the additional content is licensed and downloaded by the licensee from the central website, wherein additional royalty fees are distributed from the additional license fees in accordance with the royalty profile stored at the central website.

9. The method of claim 1, further comprising specifying usage constraints for the content and storing the usage constraints at the central website.

10. The method of claim 1, further comprising publishing the content on a third-party website.

11. The method of claim 1, wherein the step of allowing the content provider to associate the license agreement with the content further comprises allowing the content provider to select a pre-defined license agreement stored at the central website.

12. The method of claim 1, further comprising allowing the content provider to define usage restrictions for the content and to store the usage restrictions at the central website.

13. The method of claim 1, wherein the step of calculating the suggested license fee further comprise calculating a base price for the content based upon the usage category, the usage sub-category, the specific usage, and the media type associated with the content.

14. A method for online content licensing and distribution, comprising:
- providing a central website accessible using the Internet;
- receiving content from a content provider at the central website;
- allowing the content provider to associate a license agreement with the content;
- allowing the content provider to create a royalty profile by identifying at least one royalty recipient and a royalty percentage for the at least one royalty recipient;
- processing the content at the central website to determine at least one of a usage category, a usage sub-category, a specific content usage, or a media type associated with the content;
- calculating at the central website a suggested license fee for the content based upon the at least one of the usage category, the usage sub-category, the specific content usage, or the media type of the content determined by the central website;
- allowing the content provider to identify a licensee of the content;
- alerting the licensee that the content is available to be licensed;
- allowing the licensee to accept the license agreement using the central website;
- obtaining the suggested license fee from the licensee through the central website; and
- distributing royalty fees from the suggested license fee to the at least one royalty recipient in accordance with the royalty percentage of the royalty profile.

15. The method of claim 14, wherein the step of allowing the content provider to associate the license agreement with the content further comprises allowing the content provider to create the license agreement using the central website.

16. The method of claim 14, further comprising allowing the content provider to group the content with additional content uploaded to the central website.

17. The method of claim 16, further comprising associating the additional content with the license agreement.

18. The method of claim 17, further comprising associating the additional content with the royalty profile.

19. The method of claim 18, further comprising licensing the additional content to the licensee.

20. The method of claim 19, further comprising collecting additional license fees for the additional content and distributing additional royalty fees to the at least one royalty recipient in accordance with the royalty profile.

21. The method of claim 14, further comprising allowing the user to specify usage constraints for the content and storing the usage constraints at the central website.

22. The method of claim 14, further comprising publishing the content on a third-party website.

23. The method of claim 14, further comprising detecting unauthorized usage of the content using a transactional enforcement system linked to the central website.

24. The method of claim 13, wherein the step of calculating the suggested license fee further comprises adjusting the base price based upon a license parameter.

* * * * *